United States Patent
Caliskan et al.

(10) Patent No.: US 12,233,703 B2
(45) Date of Patent: *Feb. 25, 2025

(54) INTEGRATED FRAME AND BATTERY PACK STRUCTURE FOR ELECTRIC VEHICLES

(71) Applicant: Ford Global Technologies, LLC, Dearborn, MI (US)

(72) Inventors: Ari Garo Caliskan, Canton, MI (US); Kevin Mackenzie, Canton, MI (US); Kyle Gary Mattinson, Saline, MI (US); Jude Berthault, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,482

(22) Filed: Aug. 1, 2023

(65) Prior Publication Data
US 2023/0373288 A1 Nov. 23, 2023

Related U.S. Application Data

(63) Continuation of application No. 17/077,765, filed on Oct. 22, 2020, now Pat. No. 11,745,573.

(51) Int. Cl.
*B60K 1/04* (2019.01)
*B62D 21/03* (2006.01)
(Continued)

(52) U.S. Cl.
CPC ............... *B60K 1/04* (2013.01); *B62D 21/03* (2013.01); *B62D 25/2036* (2013.01); *B62D 27/065* (2013.01); *B60K 2001/0438* (2013.01)

(58) Field of Classification Search
CPC .. B60K 1/04; B60K 2001/0438; B62D 21/03; B62D 25/02036; B62D 27/065
See application file for complete search history.

(56) References Cited

U.S. PATENT DOCUMENTS

| | | | |
|---|---|---|---|
| 4,339,015 A | 7/1982 | Fowkes et al. | |
| 5,501,289 A | 3/1996 | Nishikawa et al. | |

(Continued)

FOREIGN PATENT DOCUMENTS

| | | |
|---|---|---|
| DE | 102018110519 A1 | 11/2019 |
| DE | 102018215954 A1 | 3/2020 |
| KR | 20120062260 A | 6/2012 |

OTHER PUBLICATIONS

United States Patent and Trademark Office, "Non-Final Office Action," issued in connection with U.S. Appl. No. 17/077,765, mailed Apr. 5, 2022, 14 pages.

(Continued)

*Primary Examiner* — Jason D Shanske
*Assistant Examiner* — James J Triggs
(74) *Attorney, Agent, or Firm* — Lorne Forsythe; Hanley, Flight & Zimmerman

(57) ABSTRACT

Integrated frame and battery pack structure for electric vehicles are disclosed. An example apparatus disclosed herein includes a battery pack structure including a flange to be coupled to a surface of a longitudinal rail of a frame of a vehicle, a first wall, and a second wall, the first wall and the second wall defining an interior, a battery disposed within the interior, a cross member disposed within the interior.

16 Claims, 13 Drawing Sheets

(51) Int. Cl.
    *B62D 25/20*     (2006.01)
    *B62D 27/06*     (2006.01)

(56) References Cited

U.S. PATENT DOCUMENTS

| | | |
|---|---|---|
| 6,632,560 B1 | 10/2003 | Zhou et al. |
| 8,573,683 B2 | 11/2013 | Gadhiya et al. |
| 8,608,230 B2 | 12/2013 | Young et al. |
| 8,702,161 B2 | 4/2014 | Charbonneau et al. |
| 9,012,051 B2 | 4/2015 | Lee et al. |
| 9,227,582 B2 * | 1/2016 | Katayama ............. H01M 50/24 |
| 9,533,600 B1 | 1/2017 | Schwab et al. |
| 10,017,037 B2 | 7/2018 | Newman et al. |
| 10,207,573 B2 | 2/2019 | Hara |
| 10,300,948 B2 | 5/2019 | Ashraf et al. |
| 10,464,219 B2 | 11/2019 | Robinson et al. |
| 11,124,076 B1 * | 9/2021 | Borghi .................. B62D 21/02 |
| 11,745,573 B2 | 9/2023 | Caliskan et al. |
| 2010/0066128 A1 | 3/2010 | Hendriks |
| 2017/0200990 A1 | 7/2017 | Hsu et al. |
| 2018/0050607 A1 * | 2/2018 | Matecki .................. B60L 50/64 |
| 2019/0322164 A1 | 10/2019 | Sasaki et al. |
| 2020/0207198 A1 | 7/2020 | Baccouche et al. |
| 2020/0384882 A1 | 12/2020 | Falls et al. |
| 2021/0188069 A1 * | 6/2021 | Friedman ............... B62D 27/06 |

OTHER PUBLICATIONS

United States Patent and Trademark Office, "Non-Final Office Action," issued in connection with U.S. Appl. No. 17/077,765, mailed Oct. 5, 2022, 14 pages.

United States Patent and Trademark Office, "Notice of Allowance," issued in connection with U.S. Appl. No. 17/077,765, mailed Apr. 17, 2023, 9 pages.

* cited by examiner

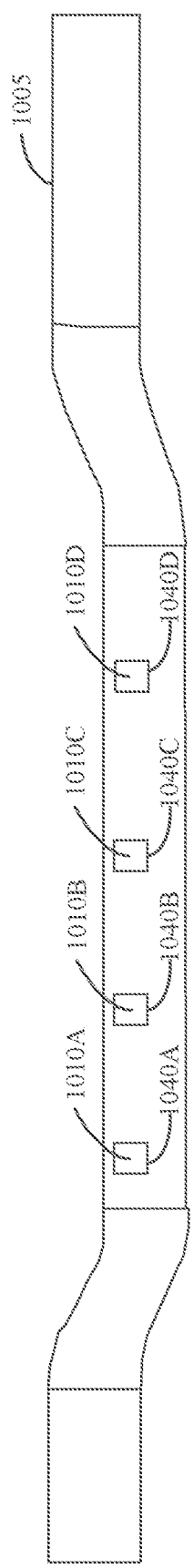
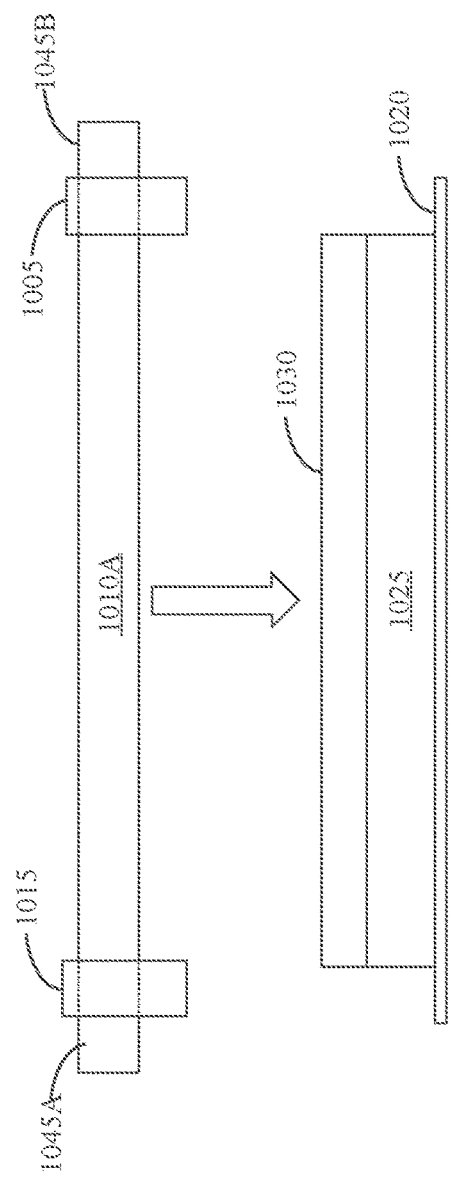
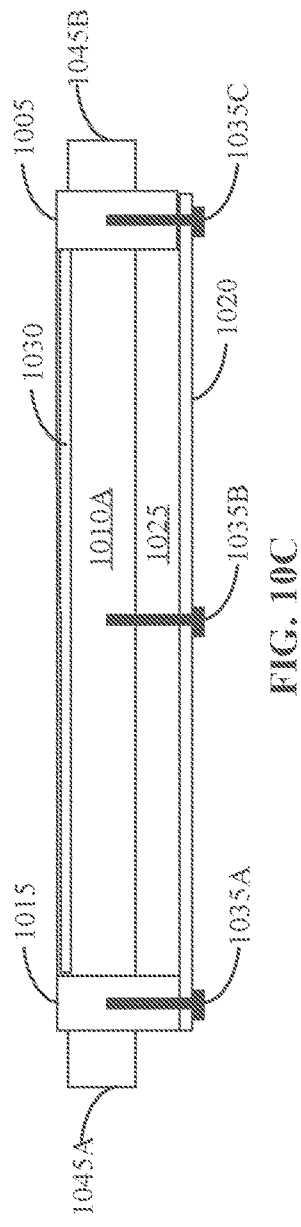
FIG. 10A
FIG. 10B
FIG. 10C

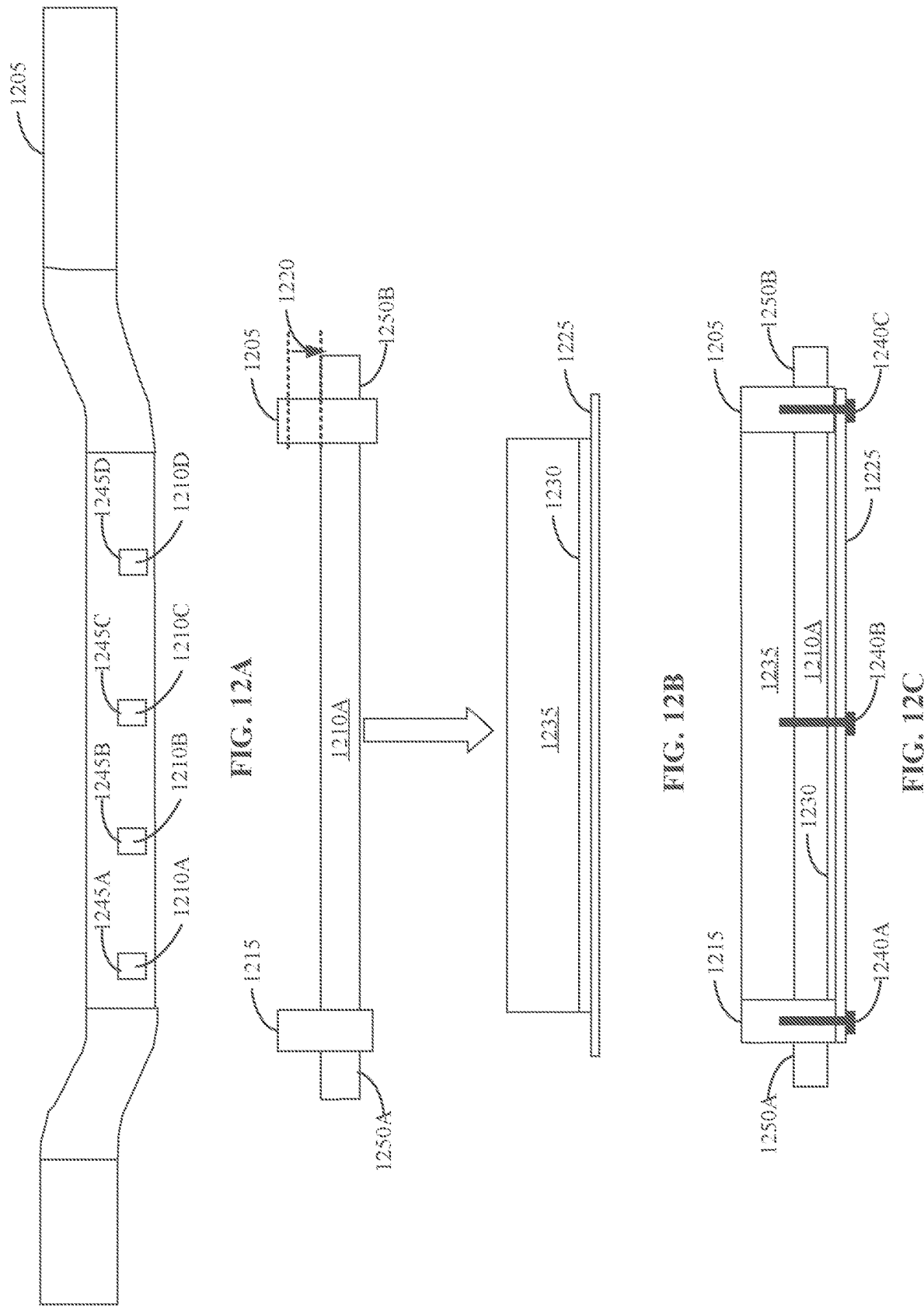

INTEGRATED FRAME AND BATTERY PACK STRUCTURE FOR ELECTRIC VEHICLES

RELATED APPLICATION

This application arises from a continuation of U.S. patent application Ser. No. 17/077,765, filed on Oct. 22, 2020, entitled "INTEGRATED FRAME AND BATTERY PACK STRUCTURE FOR ELECTRIC VEHICLES," which is incorporated herein by reference in its entirety.

FIELD OF THE DISCLOSURE

This disclosure relates generally to electric vehicles and, more particularly, to an integrated frame and battery pack structure for electric vehicles.

BACKGROUND

Known electric vehicles include an electric motor that is powered by rechargeable batteries. The rechargeable batteries are typically located in a battery pack that is placed inside the electric vehicle near the electric motor. The battery pack is typically large in size and weight to provide enough power to the electric motor over a desired travel range. The placement of the battery pack in the electric vehicle must account for the size of the battery pack while also maintaining the electric vehicle stiffness for vehicle support and crash safety loads.

SUMMARY

An example electric vehicle comprising a frame of the electric vehicle to which a body of the electric vehicle is coupled, the frame including longitudinal frame rails, a mid-section of the frame not including frame cross-members, and a battery pack mounted in the mid-section of the frame, the battery pack including battery pack cross-members, each of the battery pack cross-members connected to a top surface of the longitudinal frame rails and a bottom surface of the longitudinal frame rails.

An example electric vehicle comprising a frame of the electric vehicle isolated from a body of the electric vehicle, the frame including longitudinal frame rails and frame cross-members fixed to the frame, and a battery pack including battery pack cross-members, the battery pack cross-members connected to respective bottom surfaces of the frame cross-members and the longitudinal frame rails.

An example apparatus comprising an electric vehicle assembly having a body and a frame, the frame isolated from the body, a mid-section of the frame not including frame cross-members, and a battery pack removably coupled to the frame via bolts, the battery pack including battery pack cross-members between longitudinal frame rails in a mid-section of the frame.

BRIEF DESCRIPTION OF THE DRAWINGS

FIGS. 10A, 10B and 10C illustrate example cross-sectional views of an example first assembly of the example second integrated battery pack and frame structure of FIG. 7.

FIGS. 12A, 12B and 12C illustrate example cross-sectional views of a second assembly of the example second integrated battery pack and frame structure of FIG. 7.

Figure 1:
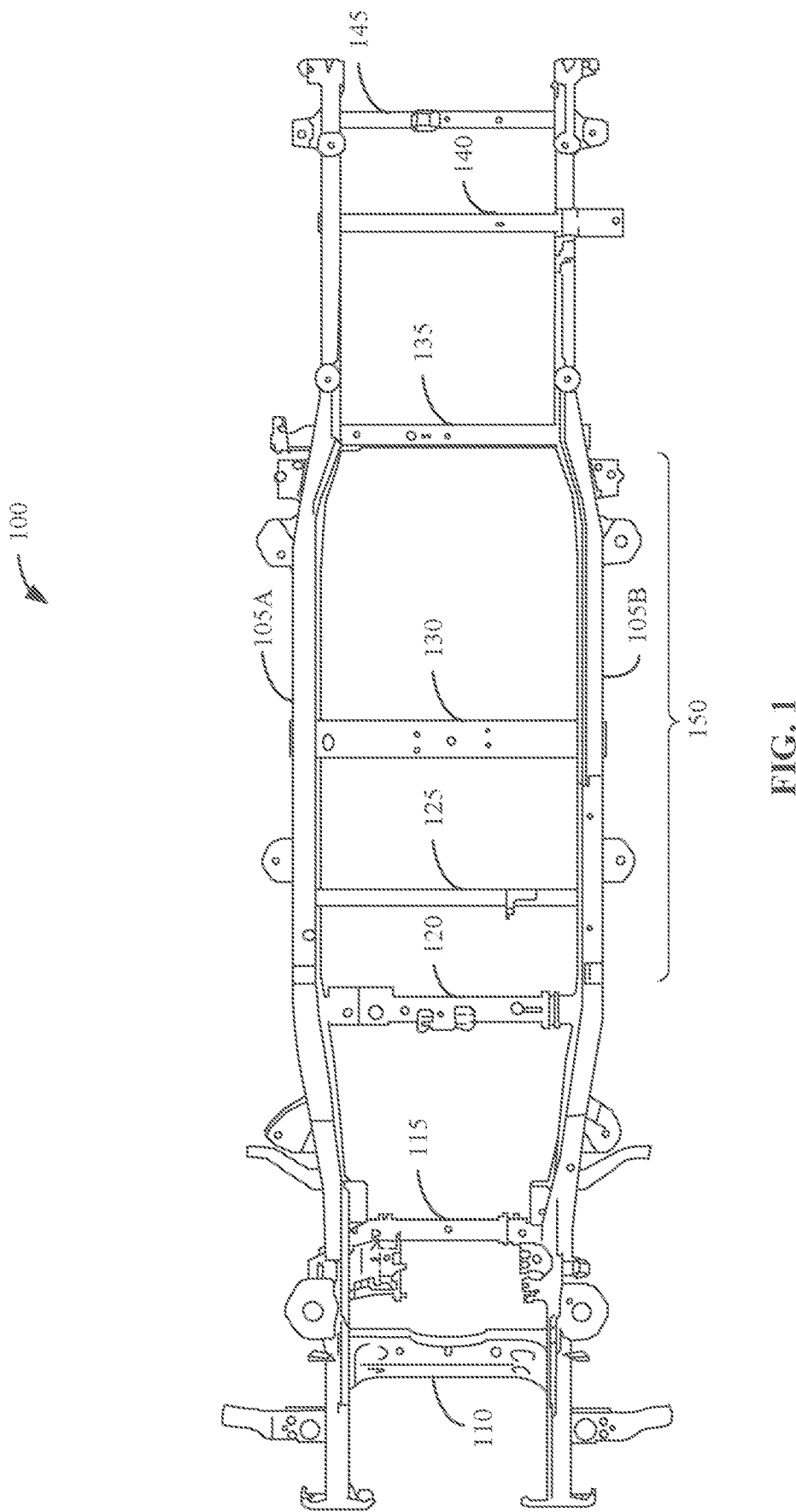
FIG. 1 illustrates an example frame for a body on frame vehicle.

The figures are not to scale. Instead, the thicknesses of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Some vehicles such as, for example, automobiles, are equipped with electric motors rather than traditional combustion engines. The electric motors are typically powered by rechargeable batteries that are located in a battery pack. The battery pack is typically large in size and weight to provide enough power to the electric motor over a desired travel range. The placement of the battery pack in the electric vehicle must account for the size of the battery pack while also maintaining the electric vehicle stiffness for vehicle support and crash safety loads.

In a unibody vehicle where the body and frame of the vehicle are integrated (e.g., a standard passenger vehicle), the body of the vehicle provides added stiffness and durability for the vehicle. However, in body on frame vehicles, the bodies and frames of the vehicles are separate (e.g., trucks, pickups, etc.), and the frame of the vehicle provides the stiffness and durability for the vehicle. For an electric body on frame vehicle, the placement of the battery pack on the frame of the vehicle is more challenging than in a unibody vehicle. In particular, if the battery pack of the body on frame vehicle decreases the stiffness and durability of the frame of the vehicle, then the overall stiffness and safety of the body on frame vehicle is decreased.

Current frame designs of body on frame vehicles and battery pack designs for electric vehicles pose packaging challenges for a large battery pack to power an all-electric body on frame vehicle. The packaging challenges include integrating a large volume of heavy batteries into the frame of the body on frame vehicle while meeting structural performance (e.g., stiffness, durability, safety, etc.), weight, serviceability, and occupant package requirements for the body on frame vehicle. However, the placement of the battery pack in the frame of the body on frame vehicle is not the only challenge. Controlling the added weight from the battery pack is another challenge for the body on frame vehicle. The battery pack design and placement should retain the stiffness of the body on frame vehicle to meet the structural performance requirements without a large increase in weight of the vehicle. The battery pack in a body on frame vehicle should minimize the amount of added weight to efficiently be able to use the power of the batteries to move the vehicle.

Current battery pack designs for body on frame vehicles do not contribute to overall stiffness of the frame or work in conjunction with the frame to mitigate intrusions. Typical frames for a body on frame vehicle include frame cross-members that provides the stiffness and durability for the vehicle for any loads that might act on the vehicle. However, in an example battery pack design, a majority of the frame cross-members were removed to make room for the battery pack, which resulted in a decrease in the structural stiffness of the vehicle. In this example design, the battery pack contained battery pack cross-members within the battery pack. However, these battery pack cross-members only acted to support the weight of the battery modules and did not provide stiffness to the vehicle. To increase the structural stiffness of the vehicle, an exoskeleton with cross-members was added below the battery pack on the frame. However, the exoskeleton added significant mass to the vehicle (e.g., greater than 100 kg of added mass), consumed substantial volume in the frame of the vehicle, and degraded the ground clearance of the vehicle. The added exoskeleton caused more challenges for the vehicle in that it increased the weight of the vehicle, which increased the load on the vehicle and decreased the efficiency of power usage.

A preferred location of the battery pack for a body on frame vehicle is between the frame rails in the mid-rail section of the frame below the body of the vehicle. However, as mentioned above, this space is occupied by frame cross-members that add stiffness to the vehicle to support noise, vibration, and harshness (NVH) and manage crash safety loads. Removing the frame cross-members would pose a challenge to meet sub-system frame stiffness targets and crash safety assessments. Placing the battery pack in the midrail section of the frame results in the midrails being pushed outward (i.e., widening the frame), which again poses a challenge to meet side pole impact requirements, and results in a large offset between the front and mid-rails of the frame.

Examples disclosed herein include a first battery pack design that is an integrated assembly with the frame of the body on frame vehicle to improve load paths and reduce redundant structural members. In examples disclosed herein, the battery pack is an integrated assembly that, when installed, adds stiffness to the frame structure. In examples disclosed herein, the first battery pack design eliminates frame cross-members in the midrail section to provide room for the battery pack. In examples disclosed herein, the battery pack includes battery pack cross-members. In examples disclosed herein, the battery pack cross-members of the first battery pack design function as cross-members of the chassis (frame) of the body on frame vehicle. In examples disclosed herein, the battery pack cross-members provide support for the battery modules in the battery pack and increase the frame stiffness for different load paths (e.g., lateral, torsional, and vertical). In examples disclosed herein, the first battery pack design eliminates the frame cross-members in the midrail section, and the battery pack cross-members are connected to the frame structure to provide support and stiffness while not duplicating structures.

Examples disclosed herein include a second battery pack design that structurally integrates a battery pack with a conventional frame of body on frame vehicles. In examples disclosed herein, the second battery pack design includes a new frame structure that has a pre-sealed battery pack that is hard mounted to the frame via the frame rails and frame cross-members. In examples disclosed herein, the second battery pack design includes battery pack cross-members within the battery pack that are bolted or otherwise fixed to the frame cross-members as well as the frame rails. In examples disclosed herein, the battery pack cross-members are connected to the frame cross-members at multiple mounting points between the battery pack and the frame structure. In examples disclosed herein, the multiple mounting points increase the number of packages for battery modules in the battery pack and improve the load paths for stiffness and side pole impact performance. In examples disclosed herein, the second battery pack design reduces the twisting of the frame where the battery pack is placed, which improves the durability of the battery modules. In examples disclosed herein, the improved connections between the battery pack structure and the frame structure using the cross-members also support the mass of the battery pack. In examples disclosed herein, the second battery pack design also allows for the top hat of the body to be either hard mounted (to provide additional vehicle stiffness and crashworthiness) or bolted (via conventional isolated mounts) to the connected battery pack and frame structures.

In examples disclosed herein, both the first battery pack design the second battery pack design improve battery pack integration into the frame structure of electric, body on frame vehicles. In examples disclosed herein, the first battery pack design and the second battery pack design include battery pack cross-members that improve stiffness for load paths from side impact events. However, in examples disclosed herein, the first battery pack design is removable and mounted to the frame using the battery pack cross-members and frame rails. In examples disclosed herein, the battery pack of the second battery pack design is an integral member of the frame through connecting the battery pack cross-members to the frame cross-members for increased load paths and stiffness. In examples disclosed herein, both the first battery pack design and second battery pack design use existing structures of the vehicle frame to minimize the amount of space consumed by the battery pack and to minimize any added weight of integrating the battery pack (to increase energy usage efficiency for the electric vehicle).

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 1 illustrates an example frame 100 for a body on frame vehicle. The frame 100 of FIG. 1 includes example longitudinal frame rails 105A, 105B, an example front cross-member 110, an example suspension cross-member 115, an example cross-member 120, an example midrail cross-member 125, an example midrail cross-member 130, an example rear suspension cross-member 135, an example rear cross-member 140, an example rear cross-member 145, and an example mid-section 150.

In the illustrated example FIG. 1, the frame 100 is isolated from the body of the body on frame vehicle. The longitudinal frame rails 105A, 105B run parallel along the length of the frame 100 to provide support for the body on frame vehicle. In some examples, the front cross-member 110, the suspension cross-member 115, and the cross-member 120 are included in the front end of the frame 100. The front cross-member 110, the suspension cross-member 115, and the cross-member 120 provide structural support and stiffness for the frame 100 in response to frontal loads. The midrail cross-member 125 and the midrail cross-member 130 are included in the mid-section 150 (e.g., the midrail section) of the frame 100. In some examples, the midrail cross-member 125 and the midrail cross-member 130 provide stiffness to the frame 100 to support noise, vibration, and harshness (NVH) for the vehicle and supports crash safety loads from impact events. In some examples, the rear suspension cross-member 135, the rear cross-member 140, and the rear cross-member 145 are included in the rear (e.g., backend) of the frame 100. The rear suspension cross-member 135, the rear cross-member 140, and the rear cross-member 145 provide structural support and stiffness to the rear of the vehicle during rear-end impact events.

In the illustrated example of FIG. 1, an advantageous location for the placement of a battery pack in an electric, body on frame vehicle is between the longitudinal frame rails 105A, 105B in the mid-section 150 of the frame 100 below the body of the vehicle. In the illustrated example of FIG. 1, this space is occupied by the midrail cross-member 125 and the midrail cross-member 130. If the midrail cross-member 125 and the midrail cross-member 130 are eliminated from the frame 100, the frame 100 would not meet frame stiffness targets or crash safety assessments for the vehicle. Examples disclosed herein include an example first integrated battery pack and frame structure and an example second integrated battery pack and frame structure for the electric, body on frame vehicle while maintaining/improving the frame stiffness targets and crash safety assessments of the frame.

Figure 2:
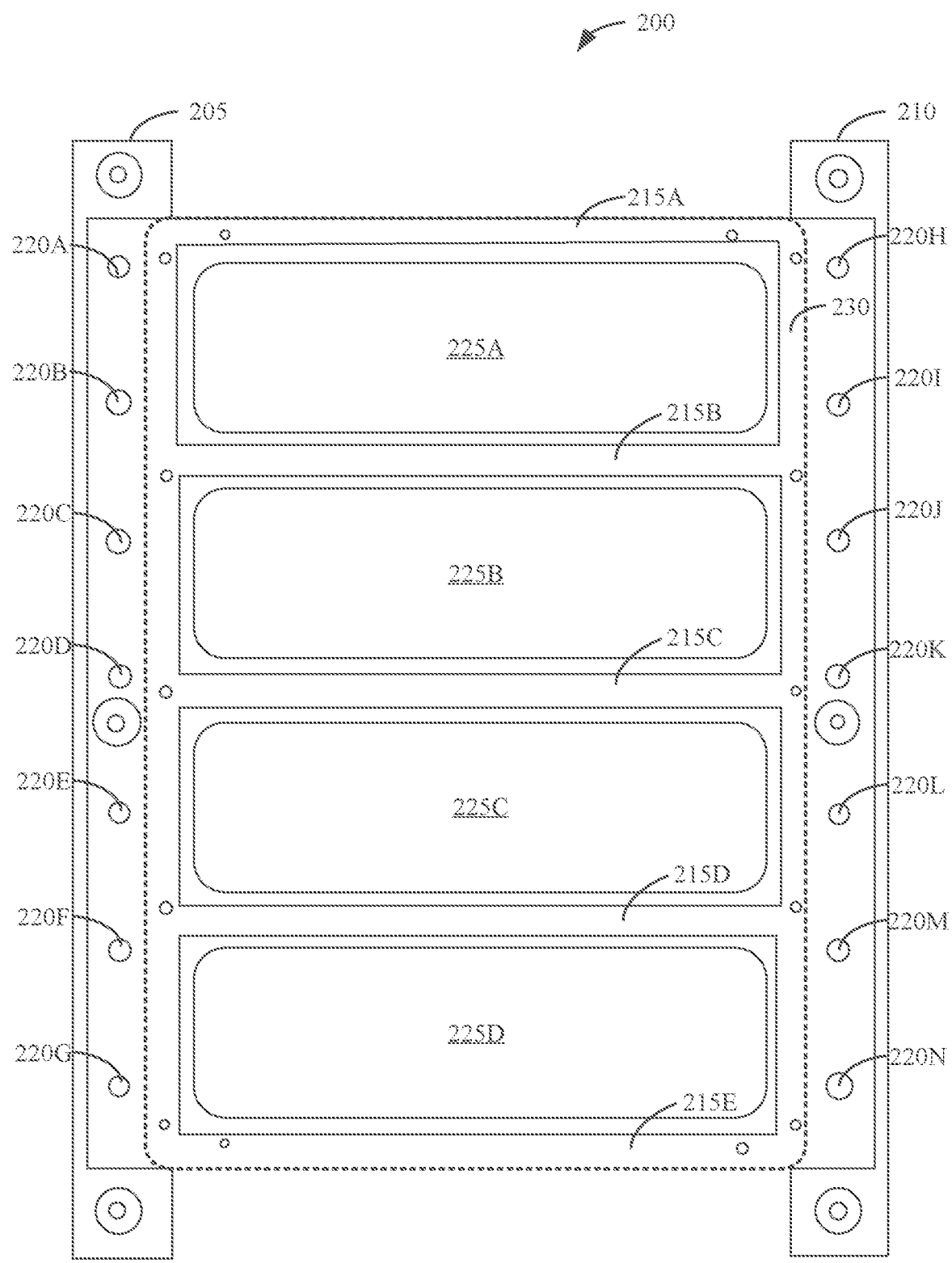
FIG. 2 illustrates an example first integrated battery pack and frame structure in accordance with the teachings of this disclosure.

FIG. 2 illustrates an example first integrated battery pack and frame structure 200 in accordance with the teachings of this disclosure. The first integrated battery pack and frame structure 200 includes an example longitudinal frame rail 205, an example longitudinal frame rail 210, example battery pack cross-members 215A, 215B, 215C, 215D, 215E, example bolts 220A, 220B, 220C, 220D, 220E, 220F, 220G, 220H, 220I, 220J, 220K, 220L, 220M, 220N, example battery modules 225A, 225B, 225C, 225D, and an example top cover 230.

In the illustrated example of FIG. 2, the longitudinal frame rail 205 and the longitudinal frame rail 210 are similar to the longitudinal frame rails 105A, 105B of FIG. 1. The longitudinal frame rail 205 and the longitudinal frame rail 210 are connected to the battery pack cross-members 215A-E via the bolts 220A-N. In the illustrated example of FIG. 2, the battery pack cross-members 215A-E are connected to top surfaces of the longitudinal frame rail 205 and the longitudinal frame rail 210 using the bolts 220A-N. In some examples, the battery pack cross-members 215A-E are connected to the longitudinal frame rail 205 and the longitudinal frame rail 210 in the midrail section (e.g., the mid-section 150 of FIG. 1) of the frame of the vehicle. In some examples, battery pack cross-members 215A-E increase the stiffness of the frame structure for different load paths (e.g., lateral, torsional, and vertical).

In the illustrated example of FIG. 2, the battery modules 225A-D are positioned between the battery pack cross-members 215A-E. In some examples, the battery pack cross-members 215A-E provide support for the battery modules 225A-D and secure the positions of the battery modules 225A-D within the battery pack structure included in the first integrated battery pack and frame structure 200. The battery modules 225A-D provide power for an electric vehicle that includes the first integrated battery pack and frame structure 200. In some examples, the battery modules 225A-D include lithium-ion batteries. However, other types of batteries may additionally and/or alternatively be used. In the illustrated example of FIG. 2, the top cover 230 is positioned on the top surfaces of the battery pack cross-members 215A-E and the battery modules 225A-D. In some examples, after the battery modules 225A-D are positioned between the battery pack cross-members 215A-E, the top cover 230 is positioned on the top surfaces of the battery pack cross-members 215A-E and the battery modules 225A-D to secure the battery modules 225A-D in the positions. In some examples, the top cover 230 is connected to the top surface of the battery pack cross-members 215A-E using bolts. However, other fasteners, such as nuts and screws, may additionally and/or alternatively be used.

Figure 3A:
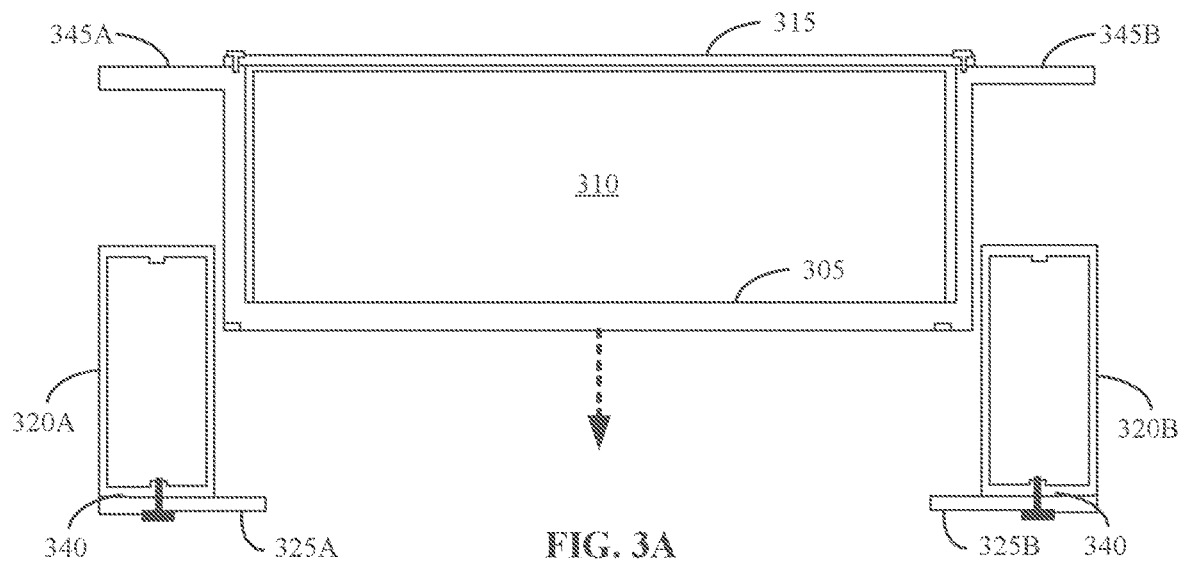
FIGS. 3A, 3B and 3C illustrate a cross-sectional view of an example first assembly of the example first integrated battery pack and frame structure of FIG. 2. discrepancy
Figure 3B:
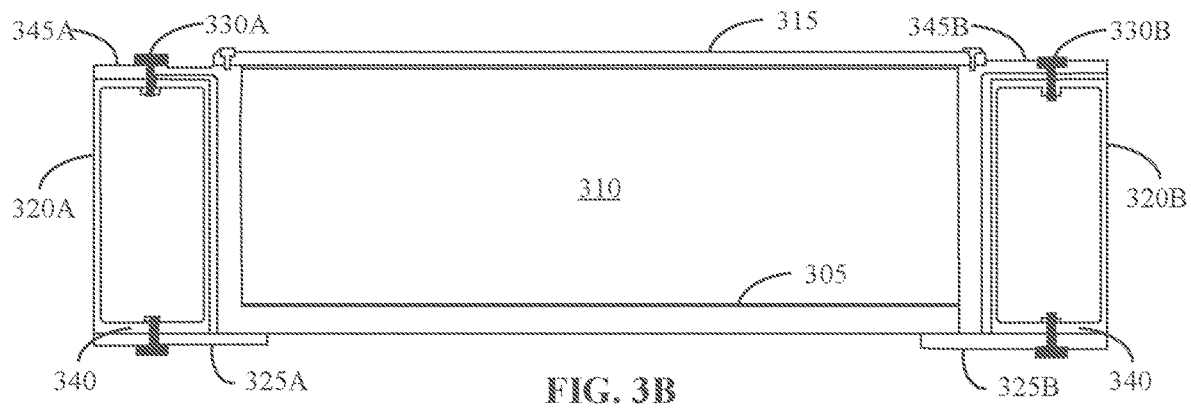
Figure 3C:
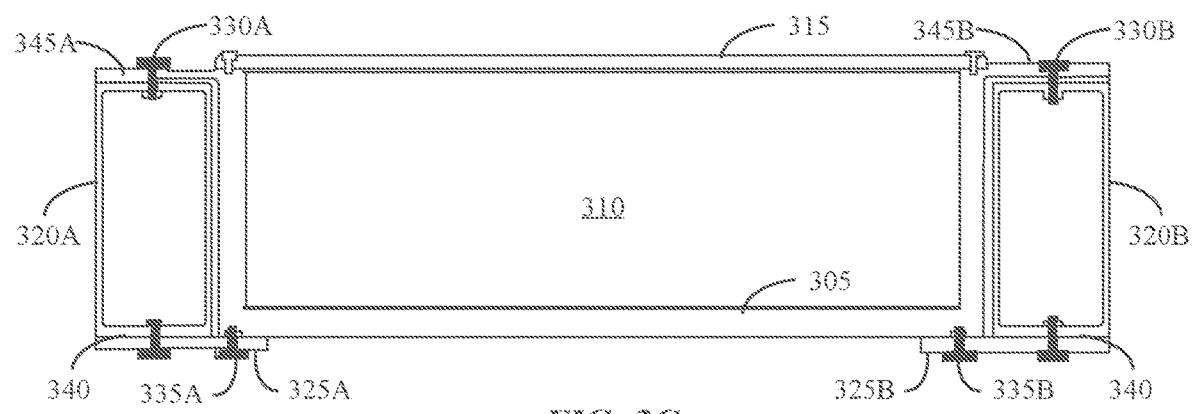

FIGS. 3A, 3B and 3C illustrate a cross-sectional view of an example first assembly of the example first integrated battery pack and frame structure 200 of FIG. 2. The first assembly of FIG. 3A includes an example battery pack structure 305, example battery pack internals 310, an example top cover 315, example longitudinal frame rails 320A, 320B, example flanges 325A, 325B, example bottom surfaces 340, and example flanges 345A, 345B.

In the illustrated example of FIG. 3A, the battery pack structure 305 is a plate (e.g., a skid plate) that is connected to a bottom surface of the battery pack internals 310. In some examples, the battery pack internals 310 include the battery pack cross-members (e.g., the battery pack cross-members 215A, 215B, 215C, 215D, 215E of FIG. 2) and the battery modules (e.g., the battery modules 225A, 225B, 225C of FIG. 2). In some examples, the battery pack structure 305 protects the battery pack internals 310 and underside of the vehicle from the ground. In some examples, the battery pack structure 305 includes an abrasion-resistant material, such as aluminum and steel, however, other materials may additionally and/or alternatively be used. In some examples, the battery pack structure 305 includes the flanges 345A, 345B. In some examples, the flanges 345A, 345B connect the battery pack structure 305 to the longitudinal frame rails 320A, 320B, which is described in further detail below in connection with FIG. 3B. In the illustrated example of FIG. 3A, the top cover 315 (e.g., similar to the top cover 230 of FIG. 2) is connected to a top surface of the battery pack internals 310. In some examples, the top cover 315 is connected to the top surface of the battery pack internals 310 to secure the battery pack internals 310 in position and to protect the battery pack internals 310 from other components inside the electric vehicle. In some examples, the top cover 315 is connected to the top surface of the battery pack internals 310 using bolts. However, other fasteners, such as nuts and screws, may additionally and/or alternatively be used.

In the illustrated example of FIG. 3A, the longitudinal frame rails 320A, 320B (e.g., similar to the longitudinal frame rails 105A, 105B of FIG. 1 and the longitudinal frame rails 205, 210 of FIG. 2) are the supporting structures of the frame of the vehicle. In the illustrated example, the longitudinal frame rails 320A, 320B are connected to the flanges 325A, 325B. In some examples, the flanges 325A, 325B are connected to bottom surfaces 340 of the longitudinal frame rails 320A, 320B using bolts. However, other fasteners, such as nuts and screws, may additionally and/or alternatively be used. In some examples, the flanges 325A, 325B provide a connection point between the longitudinal frame rails 320A, 320B and the battery pack structure 305. The illustrated example of FIG. 3A illustrates the battery pack (e.g., the battery pack structure 305, the battery pack internals 310, and the top cover 315) and the frame (e.g., the longitudinal frame rails 320A, 320B and the flanges 325A, 325B) before connecting these components to be the first integrated battery pack and frame structure 200 of FIG. 2.

The first assembly of FIG. 3B includes the battery pack structure 305, the battery pack internals 310, the top cover 315, the longitudinal frame rails 320A, 320B, the flanges 325A, 325B, the bottom surfaces 340, and the flanges 345A, 345B of FIG. 3A. The first assembly of FIG. 3B further includes example top bolts 330A, 330B. The illustrated example of FIG. 3B illustrates the battery pack (e.g., the battery pack structure 305, the battery pack internals 310, and the top cover 315) and the frame (e.g., the longitudinal frame rails 320A, 320B and the flanges 325A, 325B) of FIG. 3A after the battery pack has been lowered into the frame.

In the illustrated example of FIG. 3B, the battery pack structure 305, the battery pack internals 310, and the top cover 315 are installed between the longitudinal frame rails 320A, 320B. In the illustrated example, the battery pack structure 305, the battery pack internals 310, and the top cover 315 are installed from above the longitudinal frame rails 320A, 320B. In some examples, the battery pack structure 305 is positioned on the top surfaces of the flanges 325A, 325B. In some examples, the battery pack structure 305 is in contact with the internal, side surfaces of the longitudinal frame rails 320A, 320B. In the illustrated example of FIG. 3B, the flanges 345A, 345B included in the battery pack structure 305 are connected to the top surfaces of the longitudinal frame rails 320A, 320B using the top bolts 330A, 330B. In some examples, the top bolts 330A, 330B can alternatively be other fasteners, such as nuts, screws, etc.

The first assembly of FIG. 3C includes the battery pack structure 305, the battery pack internals 310, the top cover 315, the longitudinal frame rails 320A, 320B, the flanges 325A, 325B, the bottom surfaces 340, and the flanges 345A, 345B of FIG. 3A and the top bolts 330A, 330B of FIG. 3B. The first assembly of FIG. 3C further includes example bottom bolts 335A, 335B. The illustrated example of FIG. 3C illustrates the final connected battery pack (e.g., the battery pack structure 305, the battery pack internals 310, and the top cover 315) and frame (e.g., the longitudinal frame rails 320A, 320B and the flanges 325A, 325B) to assemble the first integrated battery pack and frame structure 200 of FIG. 2.

In the illustrated example of FIG. 3C, the battery pack structure 305 is positioned on the top surfaces of the flanges 325A, 325B as described above in connection with FIG. 3B. In the illustrated example, the battery pack structure 305 is connected to the top surfaces of the flanges 325A, 325B using the bottom bolts 335A, 335B. In some examples, the bottom bolts 335A, 335B can alternatively be other fasteners, such as nuts, screws, etc. In the illustrated example of FIG. 3C, the battery pack structure 305 (including the battery pack internals 310 and the top cover 315) is connected to the longitudinal frame rails 320A, 320B from the top and bottom (e.g., through the top bolts 330A, 330B and the bottom bolts 335A, 335B). In some examples, battery pack structure 305 is connected to the top of the longitudinal frame rails 320A, 320B using the flanges 345A, 345B, which are included in the battery pack structure 305. In some examples, the battery pack structure 305 is connected to the bottom of the longitudinal frame rails 320A, 320B using the flanges 325A, 325B, which are connected to the bottom surface of the battery pack structure 305 and the bottom surfaces 340 of the longitudinal frame rails 320A, 320B.

Figure 4A:
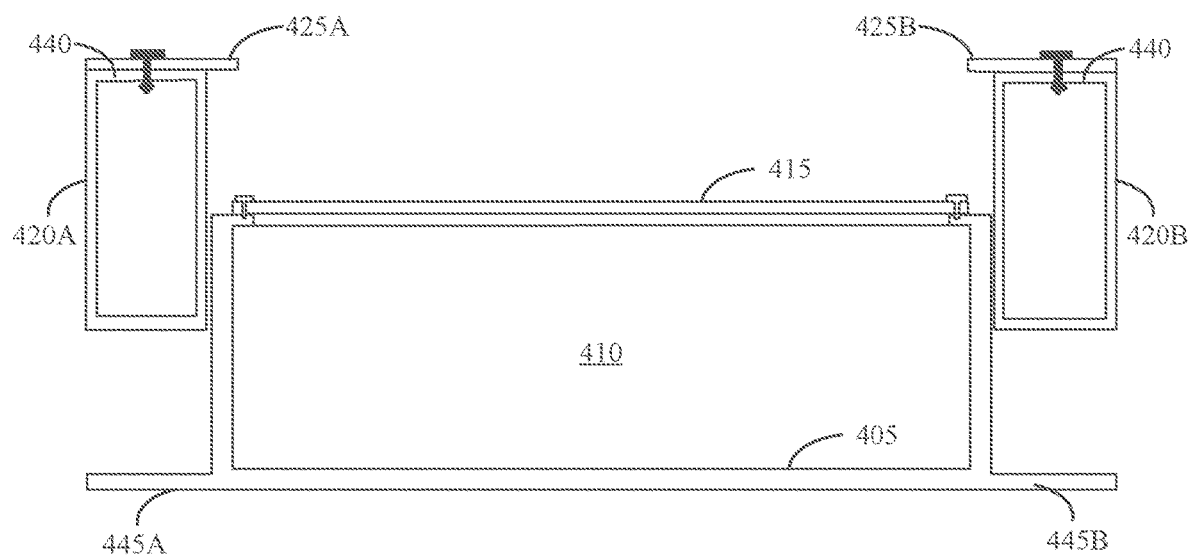
FIGS. 4A, 4B and 4C illustrate a cross-sectional view of an example second assembly of the example first integrated battery pack and frame structure of FIG. 2.
Figure 4B:
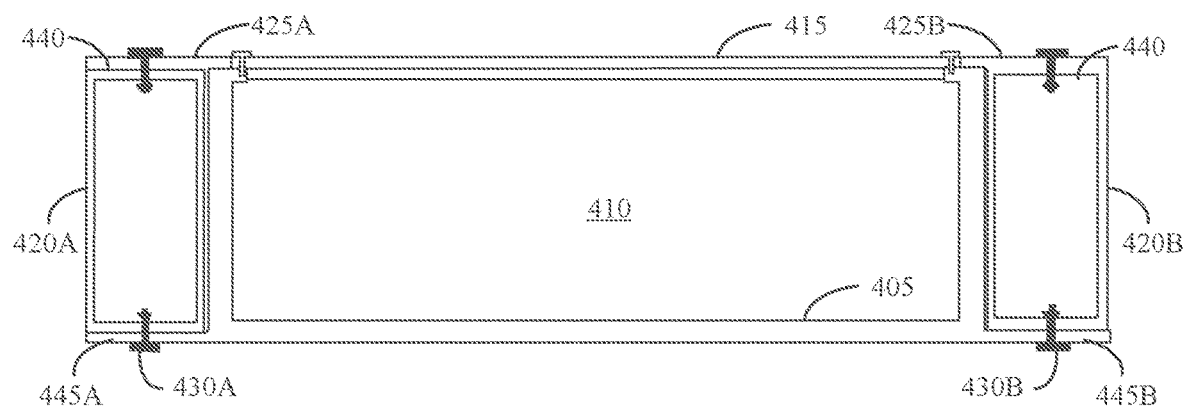
Figure 4C:
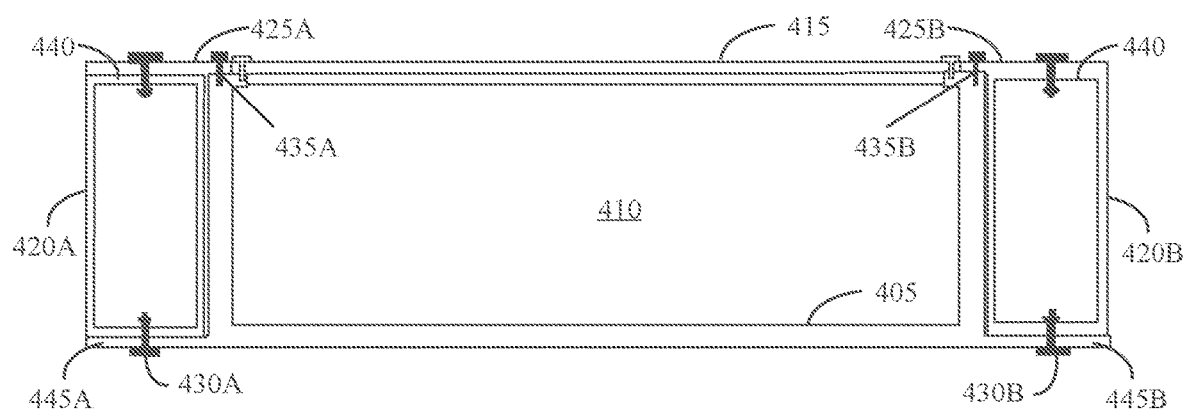

FIGS. 4A, 4B and 4C illustrate a cross-sectional view of an example second assembly of the example first integrated battery pack and frame structure 200 of FIG. 2. The second assembly of FIG. 4A includes an example battery pack structure 405, example battery pack internals 410, an example top cover 415, example longitudinal frame rails 420A, 420B, example flanges 425A, 425B, example top surfaces 440, and example flanges 445A, 445B.

In the illustrated example of FIG. 4A, the battery pack structure 405 is a plate (e.g., a skid plate) that is connected to a bottom surface of the battery pack internals 410. In some examples, the battery pack internals 410 include the battery pack cross-members (e.g., the battery pack cross-members 215A, 215B, 215C, 215D, 215E of FIG. 2) and the battery modules (e.g., the battery modules 225A, 225B, 225C of FIG. 2). In some examples, the battery pack structure 405 protects the battery pack internals 410 and underside of the vehicle from the ground. In some examples, the battery pack structure 405 includes an abrasion-resistant material, such as aluminum and steel. However, other materials may additionally and/or alternatively be used. In the illustrated example of FIG. 4A, the top cover 415 (e.g., similar to the top cover 230 of FIG. 2) is connected to a top surface of the battery pack internals 410. In some examples, the battery pack structure 405 includes the flanges 445A, 445B. In some examples, the flanges 445A, 445B connect the battery pack structure 405 to the longitudinal frame rails 420A, 420B, which is described in further detail below in connection with FIG. 4B. In some examples, the top cover 415 is connected to the top surface of the battery pack internals 410 to secure the battery pack internals 410 in position and to protect the battery pack internals 410 from other components inside the electric vehicle. In some examples, the top cover 415 is connected to the top surface of the battery pack internals 410 using bolts. However, other fasteners, such as nuts and screws, may additionally and/or alternatively be used.

In the illustrated example of FIG. 4A, the longitudinal frame rails 420A, 420B (e.g., similar to the longitudinal frame rails 105A, 105B of FIG. 1 and the longitudinal frame rail 205 and the longitudinal frame rail 210 of FIG. 2) are the supporting structures of the frame of the vehicle. In the illustrated examples, the longitudinal frame rails 420A, 420B are connected to the flanges 425A, 425B. In some examples, the flanges 425A, 425B are connected to a top surface of the longitudinal frame rails 420A, 420B using bolts. However, other fasteners, such as nuts and screws, may additionally and/or alternatively be used. In some examples, the flanges 425A, 425B provide a connection point between the longitudinal frame rails 420A, 420B and the battery pack structure 405. The example of FIG. 4A illustrates the battery pack (e.g., the battery pack structure 405, the battery pack internals 410, and the top cover 415) and the frame (e.g., the longitudinal frame rails 420A, 420B and the flanges 425A, 425B) before connecting these components to be the first integrated battery pack and frame structure 200 of FIG. 2.

The second assembly of FIG. 4B includes the battery pack structure 405, the battery pack internals 410, the top cover 415, the longitudinal frame rails 420A, 420B, the flanges 425A, 425B, the top surfaces 440, and the flanges 445A, 445B of FIG. 4A. The second assembly of FIG. 4B further includes example bottom bolts 430A, 430B. The illustrated example of FIG. 4B illustrates the battery pack (e.g., the battery pack structure 405, the battery pack internals 410, and the top cover 415) and the frame (e.g., the longitudinal frame rails 420A, 420B and the flanges 425A, 425B) of FIG. 4A after the battery pack has been raised into the frame.

In the illustrated example of FIG. 4B, the battery pack structure 405, the battery pack internals 410, and the top cover 415 are installed between the longitudinal frame rails 420A, 420B. In the illustrated example, the battery pack structure 405, the battery pack internals 410, and the top cover 415 are installed from below the longitudinal frame rails 420A, 420B. In some examples, the battery pack structure 405 is positioned on the bottom surfaces of the flanges 425A, 425B. In some examples, the battery pack structure 405 is in contact with the internal, side surfaces of the longitudinal frame rails 420A, 420B. In the illustrated example of FIG. 4B, the flanges 445A, 445B included in battery pack structure 405 are connected to the bottom surfaces of the longitudinal frame rails 420A, 420B using the bottom bolts 430A, 430B. In some examples, the bottom bolts 430A, 430B can alternatively be other fasteners, such as nuts, screws, etc.

The second assembly of FIG. 4C includes the battery pack structure 405, the battery pack internals 410, the top cover 415, the longitudinal frame rails 420A, 420B, the flanges 425A, 425B, the top surfaces 440, and the flanges 445A, 445B of FIG. 4A and the bottom bolts 430A, 430B of FIG. 4B. The second assembly of FIG. 4C further includes example top bolts 435A, 435B. The illustrated example of FIG. 4C illustrates the final connected battery pack (e.g., the battery pack structure 405, the battery pack internals 410, and the top cover 415) and frame (e.g., the longitudinal frame rails 420A, 420B and the flanges 425A, 425B) to assemble the first integrated battery pack and frame structure 200 of FIG. 2.

In the illustrated example of FIG. 4C, the battery pack structure 405 is positioned on the bottom surfaces of the flanges 425A, 425B as described above in connection with FIG. 4B. In the illustrated example, the battery pack structure 405 is connected to the bottom surfaces of the flanges 425A, 425B using the top bolts 435A, 435B. In some examples, the top bolts 435A, 435B can alternatively be other fasteners, such as nuts, screws, etc. In the illustrated example of FIG. 4C, the battery pack structure 405 (including the battery pack internals 410 and the top cover 415) is connected to the longitudinal frame rails 420A, 420B from the top and bottom (e.g., through the bottom bolts 430A, 430B and the top bolts 435A, 435B). In some examples, the battery pack structure 405 is connected to the top of the longitudinal frame rails 420A, 420B using the flanges 425A, 425B, which are connected to the top surface of the battery pack structure 405 and the top surfaces 440 of the longitudinal frame rails 420A, 420B. In some examples, battery pack structure 405 is connected to the bottom of the longitudinal frame rails 420A, 420B using the flanges 445A, 445B, which are included in the battery pack structure 405.

Figure 5:
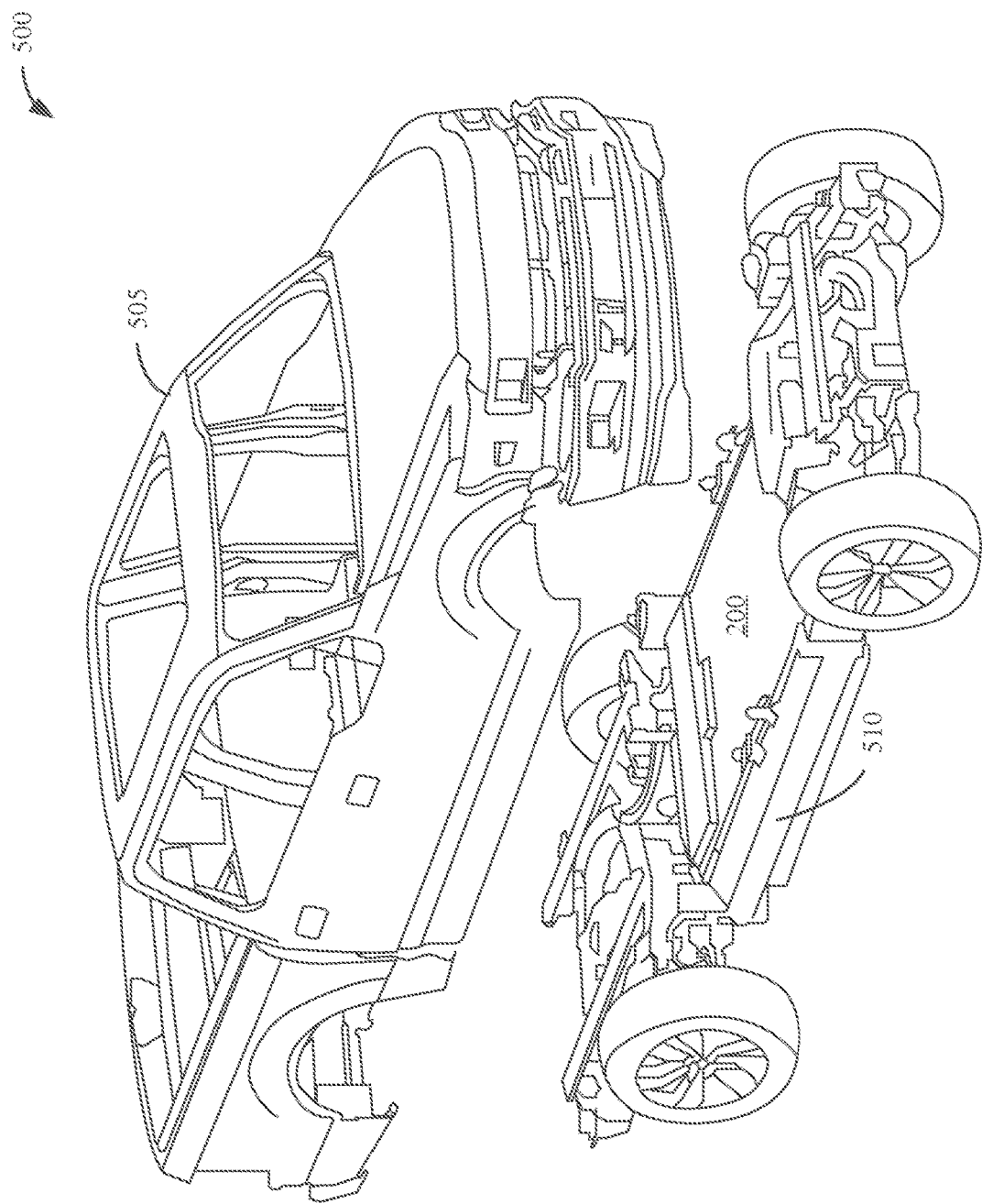
FIG. 5 illustrates an example placement of the example first integrated battery pack and frame structure of FIG. 2 in an example electric vehicle in accordance with the teachings of this disclosure.

FIG. 5 illustrates an example placement of the example first integrated battery pack and frame structure 200 of FIG. 2 in an example electric vehicle 500 in accordance with the teachings of this disclosure. The electric vehicle 500 of FIG. 5 includes an example body 505, an example frame 510, and the first integrated battery pack and frame structure 200 of FIG. 2.

In the illustrated example of FIG. 5, the electric vehicle 500 is representative of a body on frame vehicle because the body 505 is separate from the frame 510. The first integrated battery pack and frame structure 200 is positioned in a midrail section of the frame 510 (e.g., the mid-section 150 of FIG. 1). To make space for the first integrated battery pack and frame structure 200 in the electric vehicle 500, the midrail section of the frame 510 does not include any cross-members (e.g., the midrail cross-member 125 and the midrail cross-member 130 of FIG. 1). The first integrated battery pack and frame structure 200 includes the battery pack cross-members 215A, 215B, 215C, 215D, 215E that provide stiffness and structural support for the midrail section of the frame 510. In the illustrated example of FIG.

5, the battery pack included in the first integrated battery pack and frame structure 200 is separate from the frame 510. In the illustrated example of FIG. 5, the longitudinal frame rail 205 and the longitudinal frame rail 210 of FIG. 2 are included in the frame 510 while the battery pack cross-members 215A, 215B, 215C, 215D, 215E, the battery modules 225A, 225B, 225C, 225D, and the top cover 230 included in the first integrated battery pack and frame structure 200 of FIG. 2 are installed similarly to the first assembly of FIGS. 3A, 3B and 3C and/or the second assembly of FIGS. 4A, 4B and 4C. In some examples, the first integrated battery pack and frame structure 200 can be installed from the top or the bottom of the frame 510, as seen above in connection with FIGS. 3A, 3B and 3C, and FIGS. 4A, 4B and 4C, respectively.

In the illustrated example of FIG. 5, the battery pack included in the first integrated battery pack and frame structure 200 (e.g., the battery pack cross-members 215A, 215B, 215C, 215D, 215E, the battery modules 225A, 225B, 225C, 225D, and the top cover 230) is separate from the frame 510 to allow for serviceability. The battery pack included in the first integrated battery pack and frame structure 200 can be removed in one piece from the frame 510 as needed for service. In some examples, the body 505 can be removed from the electric vehicle 500 to provide access to the battery pack included in the first integrated battery pack and frame structure 200 for service.

Figure 6A:
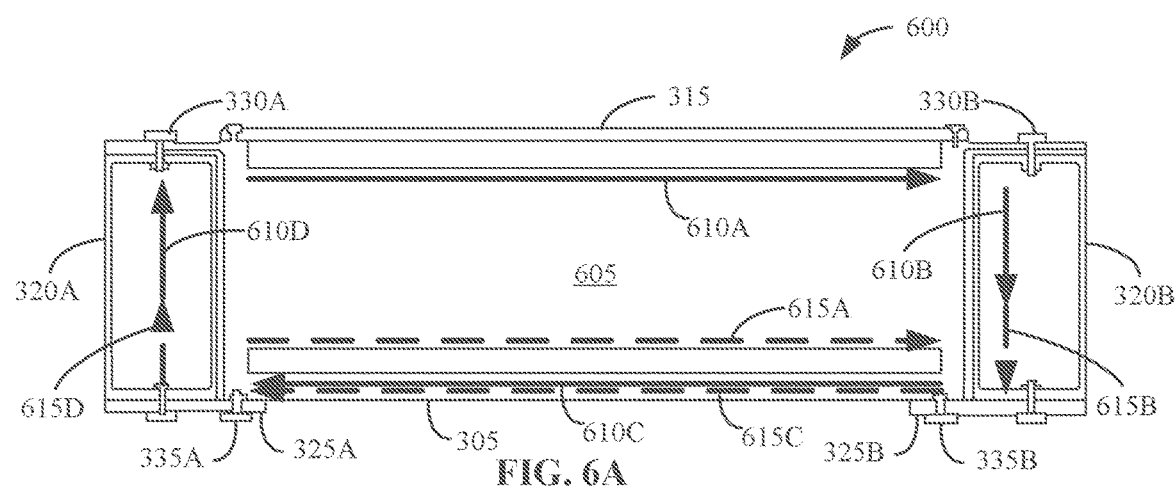
FIGS. 6A, 6B and 6C illustrate a cross-sectional view of example torsional loading, example vertical loading, and example side loading applied to the example first assembly of FIGS. 3A, 3B and 3C.
Figure 6B:
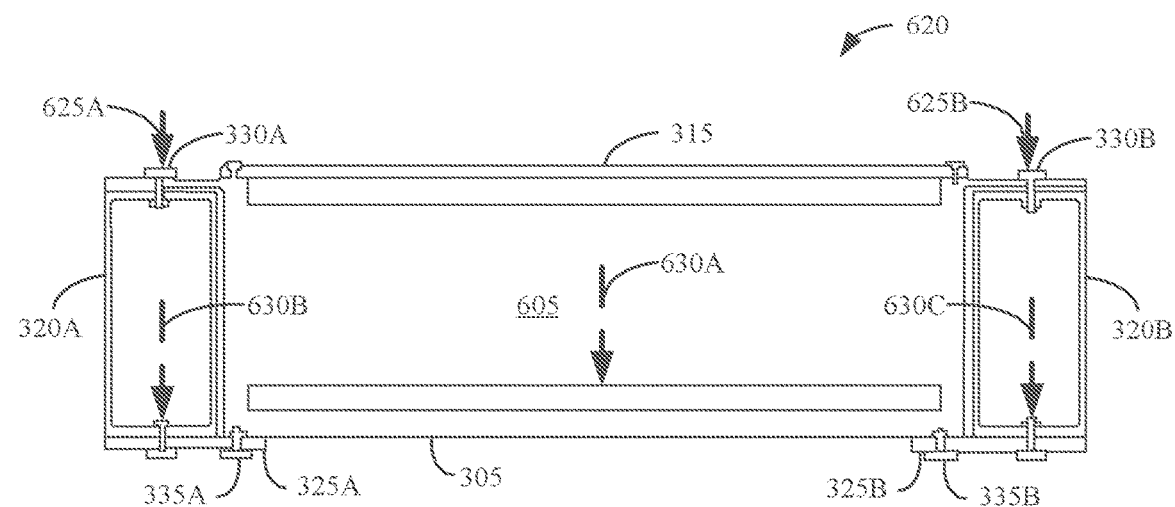
Figure 6C:
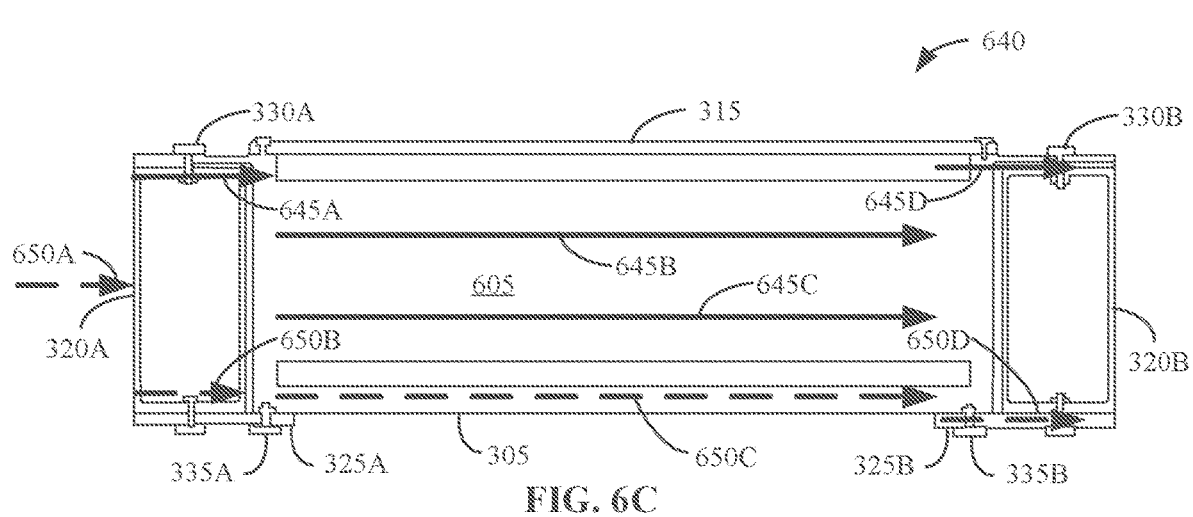

FIGS. 6A, 6B and 6C illustrate a cross-sectional view of example torsional loading 600, example vertical loading 620, and example side loading 640 applied to the example first assembly of FIGS. 3A, 3B and 3C. In some examples, the torsional loading 600, the vertical loading 620, and the side loading 640 of FIG. 6 can also be applied to the example second assembly of FIGS. 4A, 4B and 4C. The illustrated examples of FIGS. 6A, 6B and 6C are illustrative of body on frame vehicle load paths (e.g., the example electric vehicle 500 of FIG. 5). In some examples, the body (e.g., the body 505) of a body on frame vehicle is isolated from the frame (e.g., the frame 510) by rubber isolators. In such examples, the stiffness provided by the body is not applied to the top of the battery pack because of the isolation. The examples of FIGS. 6A, 6B and 6C illustrate how the first assembly of FIGS. 3A, 3B and 3C provides the necessary stiffness for the vehicle, which reduces any stress concentrations in the bottom of the frame and battery typical for body on frame vehicles.

The illustrated example of FIG. 6A includes the battery pack structure 305, the top cover 315, the longitudinal frame rails 320A, 320B, and the flanges 325A, 325B of FIG. 3A, the top bolts 330A, 330B of FIG. 3B, and the bottom bolts 335A, 335B of FIG. 3C. The torsional loading 600 of FIG. 6A further includes an example battery pack cross-member 605, example top load paths 610A, 610B, 610C, 610D, and example bottom load paths 615A, 615B, 615C, 615D. In the illustrated example of FIG. 6A, the battery pack cross-member 605 is included in the battery pack internals 310 of FIGS. 3A, 3B and 3C. The battery pack cross-member 605 is connected to the battery pack structure 305 similar to the battery pack internals 310 in FIGS. 3A, 3B and 3C.

In the illustrated example of FIG. 6A, the top load paths 610A-D illustrate the torsional load paths generated from the connection of the top surface of the battery pack structure 305 to the top surface of the longitudinal frame rails 320A, 320B. The bottom load paths 615A-D illustrate the torsional load paths generated from the connection of the bottom surface of the battery pack structure 305 and the bottom surface of the longitudinal frame rails 320A, 320B through the use of the flanges 325A, 325B as described above in connection with FIG. 3C. In the illustrated example of FIG. 6A, the top load paths 610A-D and the bottom load paths 615A-D illustrate the dispersion of stress throughout the battery pack in response to the torsional loading 600. The top connections and bottom connections present in the first assembly of FIGS. 3A, 3B and 3C allow for an even distribution of the torsional stress throughout the entire height of the battery pack cross-member 605.

In the illustrated example of FIG. 6A, the top connections between the battery pack structure 305 and the longitudinal frame rails 320A, 320B disperse the stress from the torsional loading 600 throughout the entire height of the battery pack cross-member 605, as seen in the top load paths 610A-D. The bottom connections between the battery pack structure 305 and the longitudinal frame rails 320A, 320B concentrate the stress from the torsional loading 600 at the bottom of the battery pack cross-member 605, as seen in the bottom load paths 615A-D. In the illustrated example, the top connections between the battery pack structure 305 and the longitudinal frame rails 320A, 320B work together with the bottom connections between the battery pack structure 305 and the longitudinal frame rails 320A, 320B to uniformly distribute the torsional loading 600 across the entire height of the battery pack cross-member 605, as seen in the top load path 610A-D and the bottom load path 615A-D. In some examples, the distribution of the torsional loading 600 across the entire height of the battery pack cross-member 605 allows for the entire battery pack cross-member 605 to be engaged in response to the torsional loading 600, instead of the stress from the torsional loading 600 being concentrated in a part of the battery pack cross-member 605. The top connections and bottom connections increase the stiffness of the battery pack cross-member 605, and the increased stiffness allows for minimizing any bending and/or twisting of the battery pack due to the torsional loading 600.

The illustrated example of FIG. 6B includes the battery pack structure 305, the top cover 315, the longitudinal frame rails 320A, 320B, and the flanges 325A, 325B of FIG. 3A, the top bolts 330A, 330B of FIG. 3B, the bottom bolts 335A, 335B of FIG. 3C, and the battery pack cross-member 605 of FIG. 6A. The vertical loading 620 of FIG. 6B further includes the top load paths 625A, 625B and the bottom load paths 630A, 630B, 630C.

In the illustrated example of FIG. 6B, the top load paths 625A, 625B illustrate the vertical load paths generated from the connection of the top surface of the battery pack structure 305 to the top surface of the longitudinal frame rails 320A, 320B. The bottom load paths 630A-C illustrate the vertical load paths generated from the connection of the bottom surface of the battery pack structure 305 and the bottom surface of the longitudinal frame rails 320A, 320B through the use of the flanges 325A, 325B as described above in connection with FIG. 3C. In the illustrated example of FIG. 6B, the top load paths 625A, 625B and the bottom load paths 630A-C illustrate the dispersion of stress throughout the battery pack in response to the vertical loading 620. The top connections and bottom connections present in the first assembly of FIGS. 3A, 3B and 3C work together to uniformly distribute the vertical loading 620 across the entire height of the battery pack cross-member 605, as seen in the top load path 625A, 625B and the bottom load paths 630A-C. In some examples, the distribution of the vertical loading 620 across the entire height of the battery pack cross-member 605 allows for the entire battery pack cross-member 605 to be engaged in response to the vertical loading 620, instead of the stress from the vertical loading 620 being concentrated in a part of the battery pack cross-member 605.

In the illustrated example of FIG. 6B, the top connections between the battery pack structure 305 and the longitudinal frame rails 320A, 320B concentrate the stress from the vertical loading 620 at the top of the battery pack cross-member 605, as seen in the top load paths 625A, 625B. The bottom connections between the battery pack structure 305 and the longitudinal frame rails 320A, 320B concentrate the stress from the vertical loading 620 at the bottom of the battery pack cross-member 605, as seen in the bottom load paths 630A-C. In the illustrated example, the top connections and bottom connections between the battery pack structure 305 and the longitudinal frame rails 320A, 320B work together to uniformly disperse the stress from the vertical loading 620 between the top and bottom of the battery pack cross-member 605, which allows for the entire battery pack cross-member 605 to be engaged in response to the vertical loading 620 to provide more uniform vertical loading 620, as seen in the top load paths 625A, 625B and the bottom load paths 630A-C. The top connections and bottom connections increase the stiffness (e.g., highway hop resonance stiffness) of the battery pack cross-member 605, and the increased stiffness allows for supporting the battery pack against the vertical loading 620 from the weight of the batteries in the battery pack.

The illustrated example of FIG. 6C includes the battery pack structure 305, the battery pack internals 310, the top cover 315, the longitudinal frame rails 320A, 320B, and the flanges 325A, 325B of FIG. 3A, the top bolts 330A, 330B of FIG. 3B, the bottom bolts 335A, 335B of FIG. 3C, and the battery pack cross-member 605 of FIG. 6A. The side loading 640 of FIG. 6C further includes the top load paths 645A, 645B, 645C, 645D and the bottom load paths 650A, 650B, 650C, 650D.

In the illustrated example of FIG. 6C, the top load paths 645A-D illustrate the side load paths generated from the connection of the top surface of the battery pack structure 305 to the top surface of the longitudinal frame rails 320A, 320B. The bottom load paths 650A-D illustrate the side load paths generated from the connection of the bottom surface of the battery pack structure 305 and the bottom surface of the longitudinal frame rails 320A, 320B through the use of the flanges 325A, 325B as described above in connection with FIG. 3C. In the illustrated example of FIG. 6C, the top load paths 645A-D and the bottom load paths 650A-D illustrate the dispersion of stress throughout the battery pack in response to the side loading 640. The top connections and bottom connections present in the first assembly of FIGS. 3A, 3B and 3C work together to uniformly distribute the vertical loading across the entire height of the battery pack cross-member 605, as seen in the top load paths 645A-D and bottom load paths 650A-D. In some examples, the distribution of the side loading 640 across the entire height of the battery pack cross-member 605 allows for the entire battery pack cross-member 605 to be engaged in response to the side loading 640, instead of the stress from the side loading 640 being concentrated in a part of the battery pack cross-member 605.

In the illustrated example of FIG. 6C, the top connections between the battery pack structure 305 and the longitudinal frame rails 320A, 320B concentrate the stress from the side loading 640 at the top and center of the battery pack cross-member 605, as seen in the top load paths 645A-D. The bottom connections between the battery pack structure 305 and the longitudinal frame rails 320A, 320B concentrate the stress from the side loading 640 at the bottom of the battery pack cross-member 605, as seen in the bottom load paths 650A-D. In the illustrated example, the top connections and bottom connections between the battery pack structure 305 and the longitudinal frame rails 320A, 320B work together to uniformly disperse the stress from the side loading 640 between the top, center, and bottom of the battery pack cross-member 605, which allows for the entire battery pack cross-member 605 to be engaged in response to the side loading 640 to provide more uniform side loading 640, as seen in the top load paths 640A-D and the bottom load paths 650A-D. The top connections and bottom connections provide an even load transfer through the battery pack cross-member 605, which helps to reduce the amount of deformation of the battery pack during side loading events.

Figure 7:
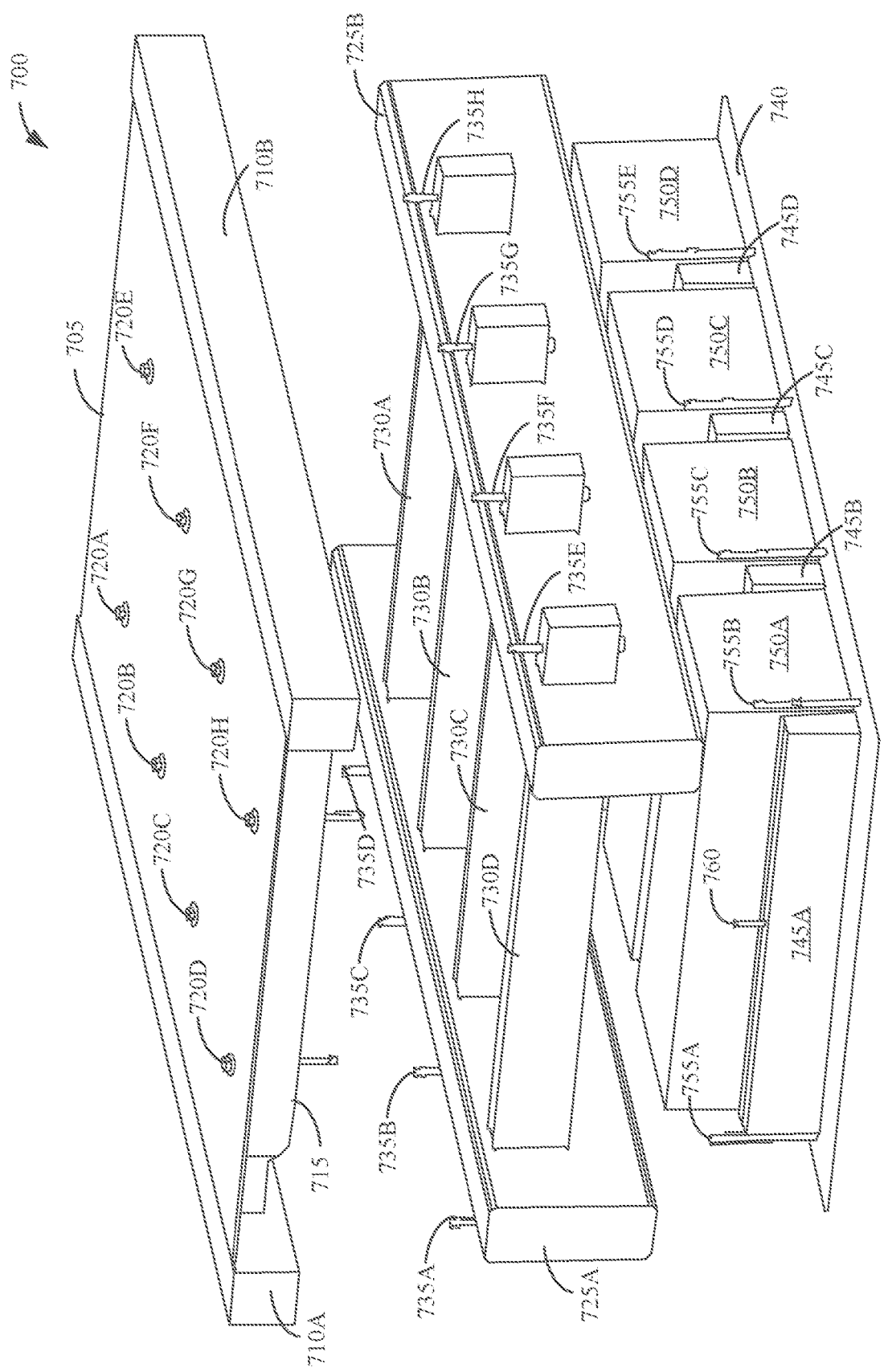
FIG. 7 illustrates an example second integrated battery pack and frame structure in accordance with the teachings of this disclosure.

FIG. 7 illustrates an example second integrated battery pack and frame structure 700 in accordance with the teachings of this disclosure. second integrated battery pack and frame structure 700 includes an example body 705, example rockers 710A, 710B, an example underbody cross-member 715, example bolts 720A, 720B, 720C, 720D, 720E, 720F, 720G, 720H, example longitudinal frame rails 725A, 725B, example frame cross-members 730A, 730B, 730C, 730D, example bolts 735A, 735B, 735C, 735D, 735E, 735F, 735G, 735H, an example battery pack structure 740, example battery pack cross-members 745A, 745B, 745C, 745D, example battery modules 750A, 750B, 750C, 750D, example bolts 755A, 755B, 755C, 755D, 755E, and an example bolt 760.

In the illustrated example of FIG. 7, the body 705 is separate from the frame structure due to the design of the body on frame vehicle. The body 705 is connected to the rockers 710A, 710B, which run longitudinally along the sides of the body 705 to provide structural support for the body 705. The underbody cross-member 715 are connected to the bottom surface of the body 705 to provide structural support and stiffness for the body 705. In some examples, there are a plurality of underbody cross-members (e.g., the underbody cross-member 715) connected to the bottom surface of the body 705. In some examples, the number of underbody cross-members is equal to the number of frame cross-members. For example, if there a four frame cross-members (the frame cross-members 730A-D), then there are four underbody cross-members. The body 705 and the underbody cross-members (e.g., including the underbody cross-member 715) are connected to the frame cross-members 730A-D using the bolts 720A-E. In some examples, the bolts 720A-E can alternatively be other fasteners, such as nuts, screws, etc. In some examples, the body 705 and the underbody cross-members are hard mounted to the frame cross-members 730A-D instead of using the bolts 720A-E via conventional isolated mounts. In some examples, hard mounting the body 705 and the underbody cross-members to the frame cross-members 730A-D provides additional vehicle stiffness and increases the crashworthiness of the vehicle in response to loads.

In the illustrated example of FIG. 7, the longitudinal frame rails 725A, 725B are similar to the longitudinal frame rails 105A, 105B of FIG. 1. The longitudinal frame rails 725A, 725B are connected to the frame cross-members 730A-D. In some examples, the frame cross-members 730A-D are inserted through the longitudinal frame rails 725A, 725B (e.g., parts of the frame cross-members 730A-D are extended through the longitudinal frame rails 725A, 725B and welded on both the inboard and outboard faces of the longitudinal frame rails 725A, 725B). In some examples, the underbody cross-members are connected to the frame cross-members 730A-D using the bolts 720A-E. For example, the underbody cross-member 715 is connected to the frame cross-member 730D using the bolts 720D and 720H. In some examples, the extensions of the frame cross-members 730A-D are connected to the rockers 710A, 710B using the bolts 735A-H. In some examples, the bolts 735A-H can alternatively be other fasteners, such as nuts, screws, etc. In some examples, the bolts 735A-H are bolted from the bottom of the extensions of the frame cross-members 730A-D up through the rockers 710A, 710B.

In the illustrated example of FIG. 7, the battery pack structure 740 is a plate (e.g., a skid plate) that is connected to bottom surfaces of the battery pack cross-members 745A-D and the battery modules 750A-D. In some examples, the battery pack structure 740 protects the undersides of the battery pack cross-members 745A-D and the battery modules 750A-D from the ground. In some examples, the battery pack structure 740 includes an abrasion-resistant material, such as aluminum and steel. However, other materials may additionally and/or alternatively be used. In some examples, the battery pack cross-members 745A-D are connected to the top surface of the battery pack structure 740. In some examples, the battery modules 750A-D are positioned between the battery pack cross-members 745A-D. In some examples, the battery pack cross-members 745A-D provide support for the battery modules 750A-D and secure the positions of the battery modules 750A-D on the battery pack structure 740. The battery modules 750A-D provide power for the electric vehicle. In some examples, the battery modules 750A-D include lithium-ion batteries. However, other types of batteries may additionally and/or alternatively be used.

In the illustrated example of FIG. 7, the battery pack structure 740 is connected to the longitudinal frame rails 725A, 725B using the bolts 755A-E. In some examples, there are more bolts than the bolts 755A-E that are not visible in the view of the second integrated battery pack and frame structure 700 of FIG. 7. In some examples, the bolts 755A-E can alternatively be other fasteners, such as nuts, screws, etc. In some examples, the bolts 755A-E are bolted from the bottom of the battery pack structure 740 up through the longitudinal frame rails 725A, 725B. In some examples, the frame structure (e.g., the longitudinal frame rails 725A, 725B and the frame cross-members 730A-D) are lowered onto the battery pack structure 740, the battery pack cross-members 745A-D, and the battery modules 750A-D. The longitudinal frame rails 725A, 725B are positioned on the top surface of the battery pack structure 740 to use the bolts 755A-E to connect the longitudinal frame rails 725A, 725B and the battery pack structure 740. The frame cross-members 730A-D are positioned on the top surface of the battery pack cross-members 745A-D.

In the illustrated example of FIG. 7, the battery pack cross-members 745A-D are connected to the frame cross-members 730A-D using bolts (e.g., bolt 760) in the center of the battery pack cross-members 745A-D and the frame cross-members 730A-D. For example, the battery pack cross-member 745A is connected to the frame cross-member 730D using the bolt 760. In some examples, there are a plurality of bolts (e.g., bolt 760) to connect the battery pack cross-members 745A-D and the frame cross-members 730A-D. In some examples, the number of bolts is equal to the number of battery pack cross-members. For example, if there are four battery pack cross-members (the battery pack cross-members 745A-D), then there are four bolts. In some examples, the plurality of bolts (including the bolt 760) can alternatively be other fasteners, such as nuts, screws, etc. In some examples, the bolts (including the bolt 760) are bolted from the bottom of the battery pack cross-members 745A-D up through the frame cross-members 730A-D. In some examples, the battery modules 750A-D are positioned between the connected battery pack cross-members 745A-D and frame cross-members 730A-D. The connected battery pack cross-members 745A-D and frame cross-members 730A-D extend the full height of the battery modules 750A-D to provide support for the battery modules 750A-D and secure the positions of the battery modules 750A-D. In some examples, the battery modules 750 A-D are positioned between the longitudinal frame rails 725A, 725B after the longitudinal frame rails 725A, 725B and the battery pack structure 740 are connected.

In the illustrated example of FIG. 7, the battery pack cross-members 745A-D are connected to the frame cross-members 730A-D and the battery pack structure 740 is connected to the longitudinal frame rails 725A, 725B to provide increased stiffness and impact strength for the second integrated battery pack and frame structure 700 in an electric vehicle. In some examples, the plurality of mounting points between the battery pack cross-members 745A-D, the frame cross-members 730A-D, the battery pack structure 740, and the longitudinal frame rails 725A, 725B via the bolts 755A-E and the bolt 760 increase the number of spaces available for the battery modules 750A-D to be installed on the battery pack structure 740 and improve the load paths for stiffness and side pole impact performance for the second integrated battery pack and frame structure 700. In some examples, the plurality of mounting points also reduces twisting (e.g., due to torsional loading) of the frame structure (e.g., the longitudinal frame rails 725A, 725B and the frame cross-members 730A-D) where the battery modules 750A-D are located, which improves the durability of the battery modules 750A-D. In the illustrated example of FIG. 7, the battery modules 750A-D are serviceable from the bottom of the battery pack structure 740, which makes service needs easier because the body 705 and the frame structure (e.g., the longitudinal frame rails 725A, 725B and the frame cross-members 730A-D) do not need to be removed to access the battery modules 750A-D.

Figure 8A:
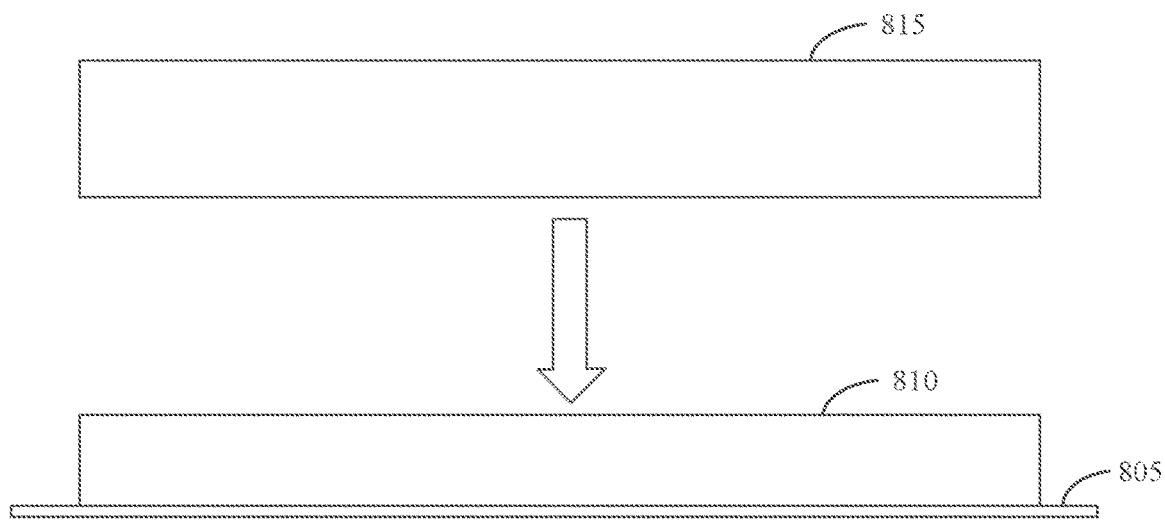
FIGS. 8A, 8B and 8C illustrate example cross-sectional views of the battery pack included in the example second integrated battery pack and frame structure of FIG. 7.
Figure 8B:
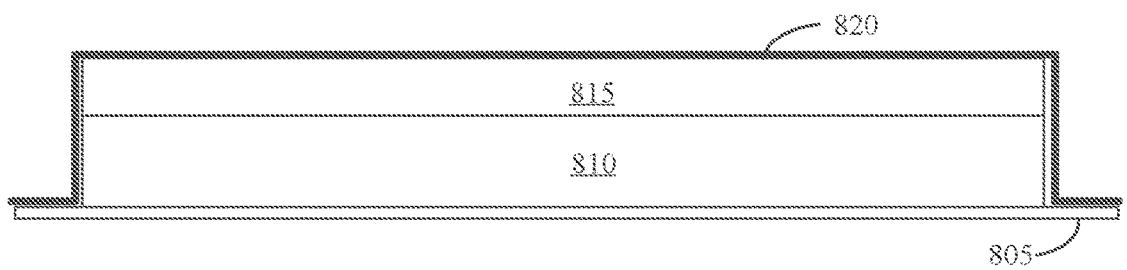
Figure 8C:
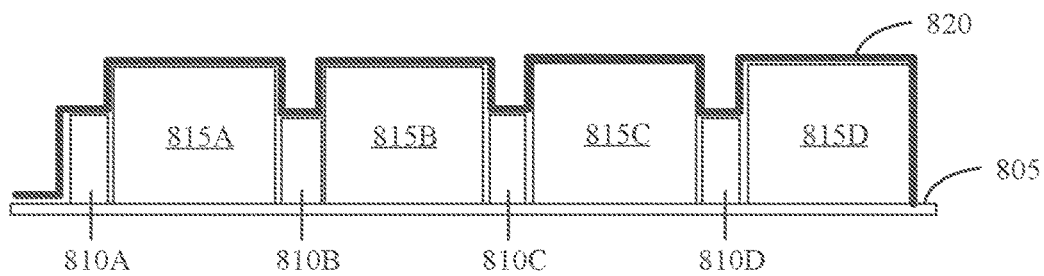

FIGS. 8A, 8B and 8C illustrate example cross-sectional views of the battery pack included in the example second integrated battery pack and frame structure 700 of FIG. 7. The illustrated example of FIG. 8A includes an example battery pack structure 805, an example battery pack cross-member 810, and an example battery module 815.

In the illustrated example of FIG. 8A, the battery pack structure 805 is a plate (e.g., a skid plate) that is connected to bottom surfaces of the battery pack cross-member 810. In some examples, the battery pack structure 805 protects the underside of the battery pack cross-member 810 from the ground. In some examples, the battery pack structure 805 includes an abrasion-resistant material, such as aluminum and steel. However, other materials may additionally and/or alternatively be used. In some examples, the battery pack structure 805 is the same as the battery pack structure 740 of FIG. 7. In some examples, the battery pack cross-member 810 is connected to the top surface of the battery pack structure 805. The battery pack cross-member 810 provides stiffness and improves load paths for the battery pack. In the illustrated example of FIG. 8A, the battery module 815 provides power for the battery pack. In some examples, the battery module 815 includes lithium-ion batteries. However, other types of batteries may additionally and/or alternatively be used. In some examples, the battery module 815 is the same as the battery modules 750A-D of FIG. 7. In the illustrated example of FIG. 8A, the battery module 815 is lowered onto the top surface of the battery pack structure 805, which is described in further detail below in connection with FIG. 8B.

The illustrated example of FIG. 8B includes the battery pack structure 805, the battery pack cross-member 810, and the battery module 815 of FIG. 8A. The illustrated example of FIG. 8B further includes an example sealant layer 820.

In the illustrated example of FIG. 8B, the battery module 815 is connected to the top surface of the battery pack structure 805. In some examples, the battery module 815 is positioned behind the battery pack cross-member 810. In some examples, the battery module 815 is positioned between two battery pack cross-members (e.g., the battery pack cross-member 810 and an additional battery pack cross-member not visible in FIG. 8B). In some examples, the battery pack cross-member 810 provides support and stiffness for the battery module 815 and secures the position of the battery module 815 on the battery pack structure 805. In the illustrated example of FIG. 8B, the battery pack cross-member 810 includes cut-outs to include space for the wiring/bus bar for electrical connections and the coolant hose for the coolant connections that are needed for the battery module 815. In the illustrated example of FIG. 8B, the sealant layer 820 is positioned on the top surfaces of the battery pack structure 805, the battery pack cross-member 810, and the battery module 815. In some examples, after the battery module 815 is positioned on the top surface of the battery pack structure 805, the sealant layer 820 is positioned on the top surfaces of the battery pack structure 805, the battery pack cross-member 810, and the battery module 815 to secure the battery module 815 in position.

The illustrated example of FIG. 8C illustrates a side view of the battery pack illustrated in FIG. 8B. The illustrated example of FIG. 8C includes the battery pack structure 805 of FIG. 8A and the sealant layer 820 of FIG. 8B. The illustrated example of FIG. 8C further includes example battery pack cross-members 810A, 810B, 810C, 810D and example battery modules 815A, 815B, 815C, 815D in accordance with the battery pack cross-member 810 and the battery module 815 of FIG. 8A, respectively.

In the illustrated example of FIG. 8C, the battery pack cross-members 810A-D are the same as the battery pack cross-member 810 of FIGS. 8A and 8B. The battery modules 815A-D are the same as the battery module 815 of FIGS. 8A and 8B. The illustrated example of FIG. 8C illustrates the plurality of battery pack cross-members (e.g., battery pack cross-members 810A-D) and the plurality of battery modules (e.g., battery modules 815A-D) that connected to the top surface of the battery pack structure 805 that are not illustrated in the front cross-sectional views of FIGS. 8A and 8B. In the illustrated example, the battery modules 815A-D are positioned between the battery pack cross-members 810A-D, as described above in connection with FIG. 8B.

Figure 9B:
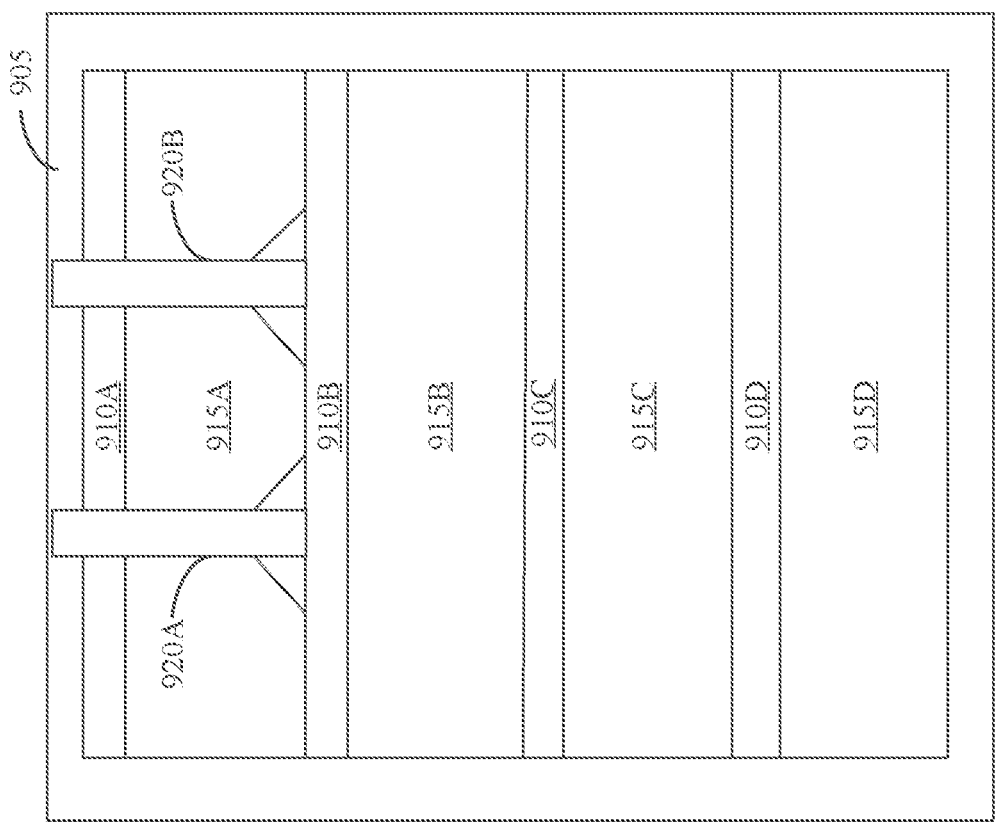
FIGS. 9A and 9B illustrate example top views of the battery pack included in the example second integrated battery pack and frame structure of FIG. 7.
Figure 9A:
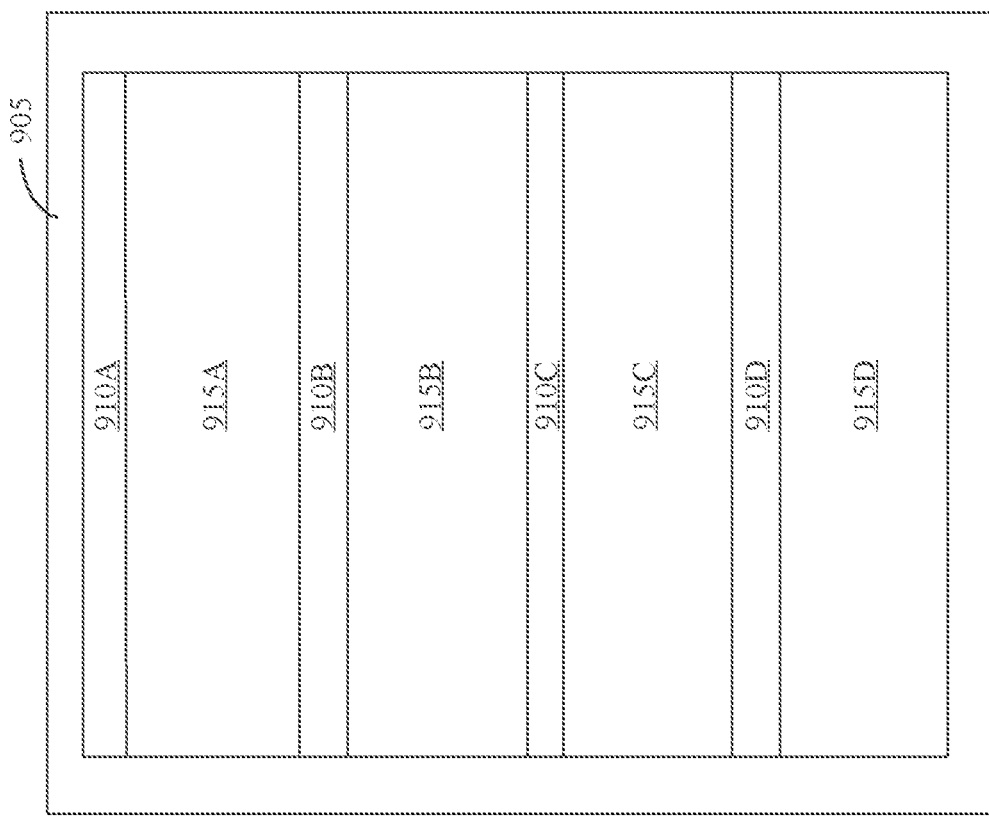

FIGS. 9A and 9B illustrate example top views of the battery pack included in the example second integrated battery pack and frame structure 700 of FIG. 7. The example top view of FIG. 9A includes an example battery pack structure 905, example battery pack cross-members 910A, 910B, 910C, 910D, and example battery modules 915A, 915B, 915C, 915D.

In the illustrated example of FIG. 9A, the battery pack structure 905 is a plate (e.g., a skid plate) that is connected to bottom surfaces of the battery pack cross-members 910A-D. In some examples, the battery pack structure 905 protects the underside of the battery pack cross-members 910A-D from the ground. In some examples, the battery pack structure 905 includes an abrasion-resistant material, such as aluminum and steel. However, other materials may additionally and/or alternatively be used. In some examples, the battery pack structure 905 is the same as the battery pack structure 740 of FIG. 7. In some examples, the battery pack cross-members 910A-D are connected to the top surface of the battery pack structure 905. The battery pack cross-members 910A-D provide stiffness and improve the load paths for the battery pack.

In the illustrated example of FIG. 9A, the battery modules 915A-D are connected to the top surface of the battery pack structure 905. In some examples, the battery modules 915A-D provide power for the battery pack. In some examples, the battery modules 915A-D include lithium-ion batteries. However, other types of batteries may additionally and/or alternatively be used. In some examples, the battery modules 915A-D are the same as the battery modules 750A-D of FIG. 7. In some examples, the battery modules 915A-D are positioned between the battery pack cross-members 910A-D. In some examples, the battery pack cross-members 910A-D provide support and stiffness for the battery modules 915A-D and secure the positions of the battery modules 915A-D on the battery pack structure 905.

The example top view of FIG. 9B includes the battery pack structure 905, the battery pack cross-members 910A, 910B, 910C, 910D, and the battery modules 915A, 915B, 915C, 915D of FIG. 9A. The top view of FIG. 9B further includes example battery pack longitudinal cross-members 920A, 920B.

In the illustrated example of FIG. 9B, the battery pack includes the battery pack longitudinal cross-members 920A, 920B in addition to the lateral battery pack cross-members 910A-D to improve front impact performance for the electric vehicle. The battery pack longitudinal cross-members 920A, 920B are perpendicular to the battery pack cross-members 910A-D. In some examples, the battery pack longitudinal cross-members 920A, 920B are positioned above the battery pack cross-member 910A. The battery pack longitudinal cross-members 920A, 920B are connected to the battery pack longitudinal cross-member 920B and the battery pack structure 905. In some examples, the battery pack longitudinal cross-members 920A, 920B provide additional stiffness to the battery pack for frontal loads.

FIGS. 10A, 10B and 10C illustrate example cross-sectional views of an example first assembly of the example second integrated battery pack and frame structure 700 of FIG. 7. The cross-sectional view of the first assembly of FIG. 10A includes an example longitudinal frame rail 1005, example frame cross-members 1010A, 1010B, 1010C, 1010D, and example inserts 1040A, 1040B, 1040C, 1040D.

In the illustrated example of FIG. 10A, the longitudinal frame rail 1005 is the same as the longitudinal frame rails 725A, 725B of FIG. 7. The longitudinal frame rail 1005 includes inserts 1040A-D in the midrail section of the longitudinal frame rails for the frame cross-members 1010A-D. In some examples, the frame cross-members 1010A-D are inserted through the longitudinal frame rail 1005 using the inserts 1040A-D. In some examples, the frame cross-members 1010A-D extend through the longitudinal frame rail 1005 to create extensions of the frame cross-members 1010A-D on the outer side of the longitudinal frame rail, which is described in further detail below in connection with FIG. 10B.

The cross-sectional view of the first assembly of FIG. 10B includes the longitudinal frame rail 1005 and the frame cross-member 1010A of FIG. 10A. The cross-sectional view of the first assembly of FIG. 10B further includes an example longitudinal frame rail 1015, an example battery pack structure 1020, an example battery pack cross-member 1025, an example battery module 1030, and example extensions 1045A, 1045B.

In the illustrated example of FIG. 10B, the longitudinal frame rail 1015 is the same as the longitudinal frame rail 1005 of FIG. 10A. In some examples, the longitudinal frame rail 1015 is parallel to the longitudinal frame rail 1005, similar to the longitudinal frame rails 725A, 725B of FIG. 7. In some examples, the frame cross-member 1010A is inserted through the longitudinal frame rail 1005 and the longitudinal frame rail 1015. In the illustrated example of FIG. 10B, the frame cross-member 1010A is extended through the longitudinal frame rail 1005 and the longitudinal frame rail 1015. In some examples, the extensions 1045A, 1045B are the parts of the frame cross-member 1010A that are extended through the longitudinal frame rail 1005 and the longitudinal frame rail 1015. In some examples, the frame cross-member 1010A is on the internal (inboard) sides of the longitudinal frame rail 1005 and the longitudinal frame rails 1015. In some examples, the extensions 1045A, 1045B are on the external (outboard) sides of the longitudinal frame rail 1005 and the longitudinal frame rails 1015. In some examples, the external sides of the longitudinal frame rail 1005 and the longitudinal frame rails 1015 are opposite to the internal sides of the longitudinal frame rail 1005 and the longitudinal frame rails 1015. In some examples, the frame cross-member 1010A is inserted through the longitudinal frame rail 1005 and the longitudinal frame rail 1015 and welded at the inboard and outboard faces of the longitudinal frame rail 1005 and the longitudinal frame rail 1015.

In the illustrated example of FIG. 10B, the battery pack structure 1020 is a plate (e.g., a skid plate) that is connected to bottom surfaces of the battery pack cross-member 1025. In some examples, the battery pack structure 1020 protects the underside of the battery pack cross-member 1025 from the ground. In some examples, the battery pack structure 1020 includes an abrasion-resistant material, such as aluminum and steel. However, other materials may additionally and/or alternatively be used. In some examples, the battery pack structure 1020 is the same as the battery pack structure 740 of FIG. 7 and the battery pack structure 805 of FIGS. 8A, 8B and 8C. In some examples, the battery pack cross-member 1025 is connected to the top surface of the battery pack structure 1020. The battery pack cross-member 1025 provides stiffness and improves load paths for the battery pack.

In the illustrated example of FIG. 10B, the battery module 1030 provides power for the battery pack. In some examples, the battery module 1030 includes lithium-ion batteries, however, other types of batteries may additionally and/or alternatively be used. In some examples, the battery module 1030 is the same as the battery modules 750A-D of FIG. 7 and the battery module 815 of FIGS. 8A, 8B and 8C. In some examples, the battery module 1030 is connected to the top surface of the battery pack structure 1020. In some examples, the battery module 1030 is positioned behind the battery pack cross-member 1025. In some examples, the battery module 1030 is positioned between two battery pack cross-members (e.g., the battery pack cross-member 1025 and an additional battery pack cross-member not visible in FIG. 10B). In some examples, the battery pack cross-member 1025 provides support and stiffness for the battery module 1030 and secures the position of the battery module 1030 on the battery pack structure 1020. In the illustrated example of FIG. 10B, the frame cross-members 1010A, the longitudinal frame rail 1005, and the longitudinal frame rail 1015 are lowered onto the top surface of the battery pack structure 1020, which is described in further detail below in connection with FIG. 10C.

The cross-sectional view of the first assembly of FIG. 10C includes the longitudinal frame rail 1005 and the frame cross-member 1010A of FIG. 10A and the longitudinal frame rail 1015, the battery pack structure 1020, the battery pack cross-member 1025, the battery module 1030, and the extensions 1045A, 1045B of FIG. 10B. The cross-sectional view of the first assembly of FIG. 10C further includes example bolts 1035A, 1035B, 1035C.

In the illustrated example of FIG. 10C, the frame cross-members 1010A, the longitudinal frame rail 1005, the longitudinal frame rail 1015, and the extensions 1045A, 1045B are lowered onto the top surface of the battery pack structure 1020. In some examples, the longitudinal frame rail 1005 and the longitudinal frame rail 1015 are connected to the top surface of the battery pack structure 1020 using the bolts 1035A and 1035C. In some examples, the frame cross-member 1010A is connected to the top surface of the battery pack cross-member 1025 using the bolt 1035B. In some examples, the bolts 1035A-C can alternatively be other fasteners, such as nuts, screws, etc.

In the illustrated example of FIG. 10C, the battery pack cross-member 1025 and the frame cross-member 1010A are layered and connected to reach the height of the battery module 1030. In some examples, the battery module 1030 is positioned between the connected battery pack cross-member 1025 and frame cross-member 1010A and an additional connected battery pack cross-member and frame cross-member not illustrated in the FIG. 10C. In some examples, the battery pack cross-member 1025 and the frame cross-member 1010A work together to increase stiffness for side impact loads early on in the impact to effectively protect the battery module 1030.

Figure 11A:
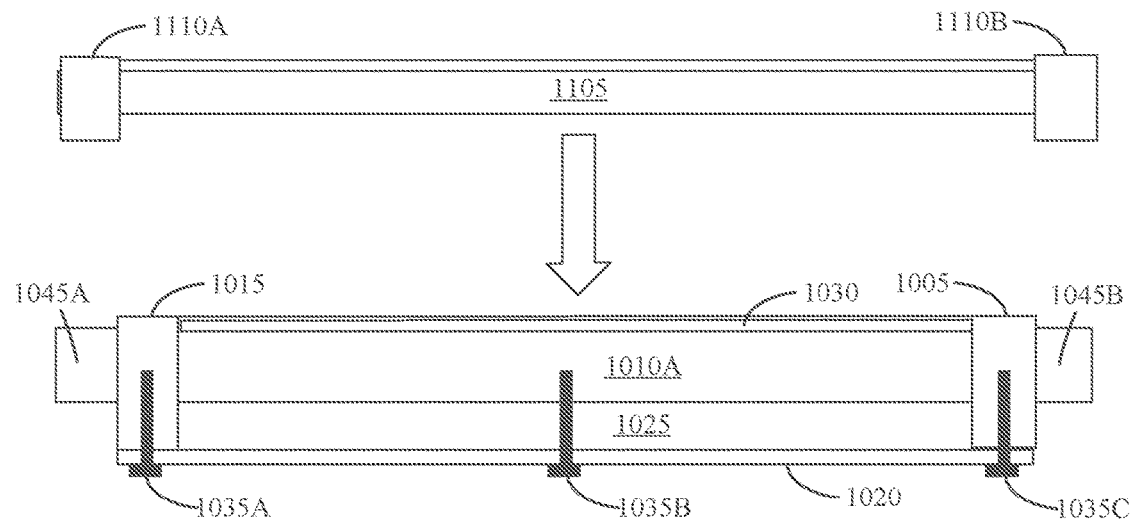
FIGS. 11A, 11B and 11C illustrate a first assembly of the example first assembly of FIGS. 10A, 10B and 10C connected to a body structure in accordance with the teachings of this disclosure.
Figure 11B:
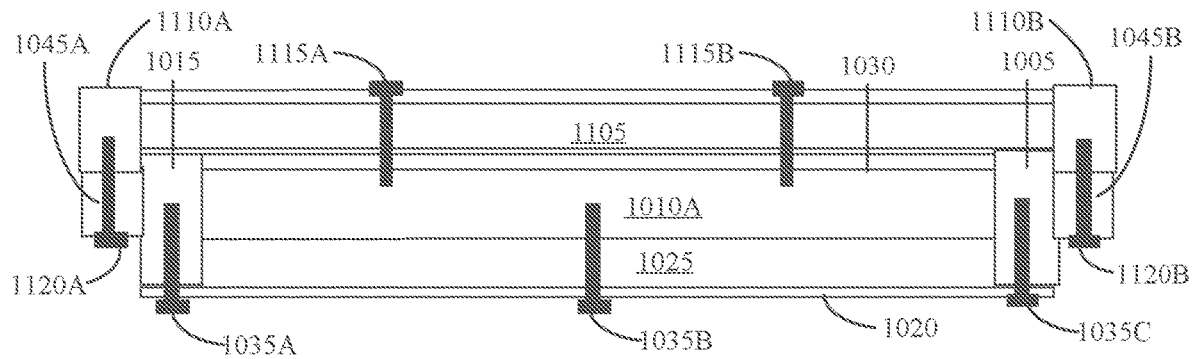
Figure 11C:
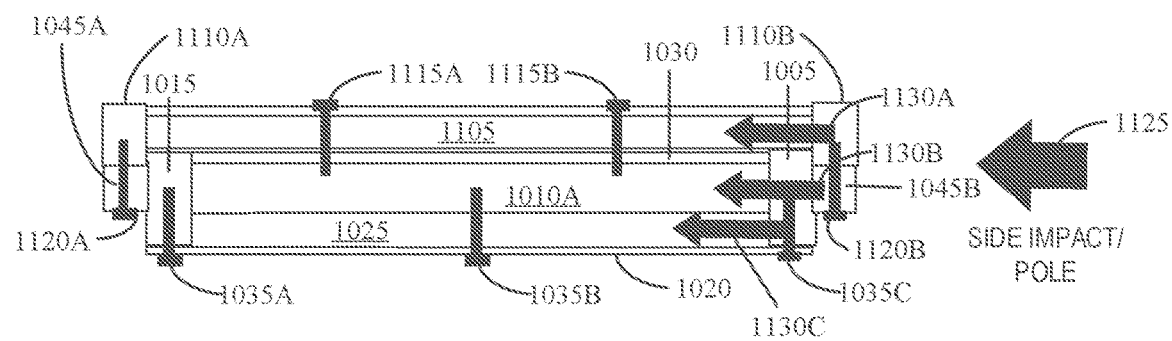

FIGS. 11A, 11B and 11C illustrate an example first assembly of the example first assembly of FIGS. 10A, 10B and 10C connected to a body structure in accordance with the teachings of this disclosure. The illustrated example of FIG. 11A includes the longitudinal frame rail 1005 and the frame cross-member 1010A of FIG. 10A, the longitudinal frame rail 1015, the battery pack structure 1020, the battery pack cross-member 1025, the battery module 1030, and the extensions 1045A, 1045B of FIG. 10B, and the bolts 1035A, 1035B, 1035C of FIG. 10C. The illustrated example of FIG. 11A further includes an example underbody cross-member 1105 and example rockers 1110A, 1110B.

In the illustrated example of 11A, the underbody cross-member 1105 is connected to the bottom surface of the body of the electric vehicle to provide structural support and stiffness for the body. The underbody cross-member 1105 is connected to the rockers 1110A, 1110B, which run longitudinally along the sides of the body to provide structural support for the body. In the illustrated example of FIG. 11A, the underbody cross-member 1105 and the rockers 1110A, 1110B are lowered onto the top surface of the frame cross-member 1010A, the top surface of the longitudinal frame rail 1005, the top surface of the longitudinal frame rail 1015, and the top surfaces of the extensions 1045A, 1045B, which is described in further detail below in connection with FIG. 11B.

The illustrated example of FIG. 11B includes the longitudinal frame rail 1005 and the frame cross-member 1010A of FIG. 10A, the longitudinal frame rail 1015, the battery pack structure 1020, the battery pack cross-member 1025, the battery module 1030, and the extensions 1045A, 1045B of FIG. 10B, the bolts 1035A, 1035B, 1035C of FIG. 10C, and the underbody cross-member 1105 and the rockers 1110A, 1110B of FIG. 11A. The illustrated example of FIG. 11B further includes example bolts 1115A, 1115B and example bolts 1120A, 1120B.

In the illustrated example of FIG. 11B, the underbody cross-member 1105 is connected to the frame cross-member 1010A using the bolts 1115A, 1115B. In some examples, the bolts 1115A, 1115B can alternatively be other fasteners, such as nuts, screws, etc. In some examples, the underbody cross-member 1105 is not connected to the frame cross-member 1010A (e.g., the bolts 1115A, 1115B are not included), which keeps the body isolated from the frame of the electric vehicle. In some examples, the extensions 1045A, 1045B of the frame cross-member 1010A are connected to the rockers 1110A, 1110B using the bolts 1120A, 1120B. In some examples, the bolts 1120A, 1120B can alternatively be other fasteners, such as nuts, screws, etc. In some examples, the bolts 1120A, 1120B are bolted from the bottom of the extensions 1045A, 1045B up through the rockers 1110A, 1110B.

The illustrated example of FIG. 11C includes the longitudinal frame rail 1005 and the frame cross-member 1010A of FIG. 10A, the longitudinal frame rail 1015, the battery pack structure 1020, the battery pack cross-member 1025, the battery module 1030, and the extensions 1045A, 1045B of FIG. 10B, the bolts 1035A, 1035B, 1035C of FIG. 10C, the underbody cross-member 1105 and the rockers 1110A, 1110B of FIG. 11A, and the bolts 1115A, 1115B and the bolts 1120A, 1120B of FIG. 11B. The illustrated example of FIG. 11C further includes an example side impact 1125, and example side load paths 1130A, 1130B, 1130C.

In the illustrated example of FIG. 11C, the side load paths 1130A-C illustrate the side load paths generated from the connection of the underbody cross-member 1105 to the frame cross-member 1010A, the connection of the rockers 1110A, 1110B to the extensions 1045A, 1045B, the connection of the frame cross-member 1010A and the battery pack cross-member 1025, and the connection of the battery pack structure 1020 and the longitudinal frame rail 1005 and longitudinal frame rail 1015. In the illustrated example of FIG. 11C, the side load paths 1130A-C illustrate the dispersion of stress throughout the battery pack cross-member 1025, the frame cross-member 1010A, and the underbody cross-member 1105 in response to the side impact 1125. The connections between the underbody cross-member 1105, the rockers 1110A, 1110B, the frame cross-member 1010A, the extensions 1045A, 1045B, the battery pack cross-member 1025, the battery pack structure 1020, the longitudinal frame rail 1005, and longitudinal frame rail 1015 allow for an even distribution of the side stress across the entire height of the battery module 1030.

In the illustrated example of FIG. 11C, the connection of the underbody cross-member 1105 to the frame cross-member 1010A and the connection of the rockers 1110A, 1110B to the extensions 1045A, 1045B disperse a portion of the side stress from the side impact 1125 to the underbody cross-member 1105 (e.g., the side load path 1130A). The connection of the rockers 1110A, 1110B to the extensions 1045A, 1045B and the connection of the frame cross-member 1010A and the battery pack cross-member 1025 disperse a portion of the side stress from the side impact 1125 to the frame cross-member 1010A (e.g., the side load path 1130B). The connection of the frame cross-member 1010A and the battery pack cross-member 1025 and the connection of the battery pack structure 1020 and the longitudinal frame rail 1005 and longitudinal frame rail 1015 disperse a portion of the side stress from the side impact 1125 to the battery pack cross-member 1025 (e.g., the side load path 1130C). In the illustrated example, the battery pack cross-member 1025, the frame cross-member 1010A, and the underbody cross-member 1105 work together to disperse the stress between the top, center, and bottom of the total height of the battery module 1030 to provide more uniform side loading, as seen in the side load paths 1130A, 1130B, 1130C.

FIGS. 12A, 12B and 12C illustrate example cross-sectional views of a second assembly of the example second integrated battery pack and frame structure 700 of FIG. 7. The cross-sectional view of the second assembly of FIG. 12A includes an example longitudinal frame rail 1205, example frame cross-members 1210A, 1210B, 1210C, 1210D, and example inserts 1245A, 1245B, 1245C, 1245D.

In the illustrated example of FIG. 12A, the longitudinal frame rail 1205 is the same as the longitudinal frame rails 725A, 725B of FIG. 7. The longitudinal frame rail 1205 includes inserts 1245A-D in the midrail section of the longitudinal frame rails for the frame cross-members 1210A-D. In some examples, the frame cross-members 1210A-D are inserted through the longitudinal frame rail 1205 using the inserts 1245A-D. In the illustrated example of FIG. 12A, the inserts 1245A-D are located lower on the longitudinal frame rail 1205, which cases the frame cross-members 1210A-D to be inserted lower on the longitudinal frame rail 1205 compared to the illustrated example of the first assembly of FIG. 10A. In some examples, the frame cross-members 1210A-D extend through the longitudinal frame rail 1205 to create extensions of the frame cross-members 1210A-D on the outer side of the longitudinal frame rail, which is described in further detail below in connection with FIG. 12B.

The cross-sectional view of the second assembly of FIG. 12B includes the longitudinal frame rail 1205 and the frame cross-members 1210A of FIG. 12A. The cross-sectional view of the second assembly of FIG. 12B further includes an example longitudinal frame rail 1215, an example position change 1220, an example battery pack structure 1225, an example battery pack cross-member 1230, an example battery module 1235, and example extensions 1250A, 1250B.

In the illustrated example of FIG. 12B, the longitudinal frame rail 1215 is the same as the longitudinal frame rail 1205 of FIG. 12A. In some examples, the longitudinal frame rail 1215 is parallel to the longitudinal frame rail 1205, similar to the longitudinal frame rails 725A, 725B of FIG. 7. In some examples, the frame cross-member 1210A is inserted through the longitudinal frame rail 1205 and the longitudinal frame rail 1215. In the illustrated example of FIG. 12B, the frame cross-member 1210A is extended through the longitudinal frame rail 1205 and the longitudinal frame rail 1215. In some examples, the extensions 1250A, 1250B are the parts of the frame cross-member 1210A that are extended through the longitudinal frame rail 1205 and the longitudinal frame rail 1215. In some examples, the frame cross-member 1210A is on the internal (inboard) sides of the longitudinal frame rail 1205 and the longitudinal frame rails 1215. In some examples, the extensions 1250A, 1250B are on the external (outboard) side of the longitudinal frame rail 1205 and the longitudinal frame rail 1215. In some examples, the external sides of the longitudinal frame rail 1205 and the longitudinal frame rails 1215 are opposite to the internal sides of the longitudinal frame rail 1205 and the longitudinal frame rails 1215. In some examples, the frame cross-member 1210A is inserted through the longitudinal frame rail 1205 and the longitudinal frame rail 1215 and welded at the inboard and outboard faces of the longitudinal frame rail 1205 and the longitudinal frame rail 1215. In the illustrated example of FIG. 12B, the position change 1220 illustrates the difference where the frame cross-member 1210A is inserted through the longitudinal frame rail 1205 and the longitudinal frame rail 1215 compared to where the frame cross-member 1010A is inserted through longitudinal frame rail 1005 and the longitudinal frame rail 1015 in FIGS. 10A, 10B and 10C. The position change 1220 illustrates that the frame cross-member 1210A is inserted lower on the longitudinal frame rail 1205 and the longitudinal frame rail 1215 compared to the illustrated example of the first assembly of FIGS. 10A, 10B and 10C. In some examples, the position change 1220 allows an example underbody cross-member to be inserted further down in the vertical direction to improve the packaging of the battery pack by decreasing the size of the battery pack.

In the illustrated example of FIG. 12B, the battery pack structure 1225 is a plate (e.g., a skid plate) that is connected to bottom surfaces of the battery pack cross-member 1230. In some examples, the battery pack structure 1225 protects the underside of the battery pack cross-member 1230 from the ground. In some examples, the battery pack structure 1225 includes an abrasion-resistant material, such as aluminum and steel. However, other materials may additionally and/or alternatively be used. In some examples, the battery pack structure 1225 is the same as the battery pack structure 740 of FIG. 7 and the battery pack structure 805 of FIGS. 8A, 8B and 8C. In some examples, the battery pack cross-member 1230 is connected to the top surface of the battery pack structure 1225. The battery pack cross-member 1230 provides stiffness and improves load paths for the battery pack. In the illustrated example of FIG. 12B, the battery pack cross-member 1230 is shallow in height compared to the battery pack cross-member 1025 of FIGS. 10B and 10C. In some examples, the battery pack cross-member 1230 is shallow in height to make room for the position change 1220 associated with the frame cross-member 1210A.

In the illustrated example of FIG. 12B, the battery module 1235 provides power for the battery pack. In some examples, the battery module 1235 includes lithium-ion batteries, however, other types of batteries may additionally and/or alternatively be used. In some examples, the battery module 1030 is the same as the battery modules 750A-D of FIG. 7 and the battery module 815 of FIGS. 8A, 8B and 8C. In some examples, the battery module 1235 is connected to the top surface of the battery pack structure 1225. In some examples, the battery module 1235 is positioned behind the battery pack cross-member 1230. In some examples, the battery module 1235 is positioned between two battery pack cross-members (e.g., the battery pack cross-member 1230 and an additional battery pack cross-member not visible in FIG. 12B). In some examples, the battery pack cross-member 1230 provides support and stiffness for the battery module 1235 and secures the position of the battery module 1235 on the battery pack structure 1225. In the illustrated example of FIG. 12B, the frame cross-member 1210A, the longitudinal frame rail 1205, and the longitudinal frame rail 1215 are lowered onto the top surface of the battery pack structure 1225, which is described in further detail below in connection with FIG. 12C.

The cross-sectional view of the second assembly of FIG. 12C includes the longitudinal frame rail 1205 and the frame cross-members 1210A of FIG. 12A and the longitudinal frame rail 1215, the battery pack structure 1225, the battery pack cross-member 1230, the battery module 1235, and the extensions 1250A, 1250B of FIG. 12B. The cross-sectional view of the second assembly of FIG. 12C further includes example bolts 1240A, 1240B, 1240C.

In the illustrated example of FIG. 12C, the frame cross-member 1210A, the longitudinal frame rail 1205, the longitudinal frame rail 1215, and the extensions 1250A, 1250B are lowered onto the top surface of the battery pack structure 1225. In some examples, the longitudinal frame rail 1205 and the longitudinal frame rail 1215 are connected to the top surface of the battery pack structure 1225 using the bolts 1240A and 1240C. In some examples, the frame cross-member 1210A is connected to the top surface of the battery pack cross-member 1230 using the bolt 1240B. In some examples, the bolts 1240A-C can alternatively be other fasteners, such as nuts, screws, etc.

In the illustrated example of FIG. 12C, the battery module 1235 is positioned between the connected battery pack cross-member 1230 and frame cross-member 1210A and an additional connected battery pack cross-member and frame cross-member not illustrated in the FIG. 12C. In some examples, the battery pack cross-member 1230 and the frame cross-member 1210A work together to increase stiffness for side impact loads early on in the impact to effectively protect the battery module 1235. In the illustrated example of FIG. 12C, the connected battery pack cross-member 1230 and frame cross-member 1210A do not extend to the full height of the battery module 1235, unlike the connected battery pack cross-member 1025 and frame cross-member 1010A of FIG. 10C.

Figure 13A:
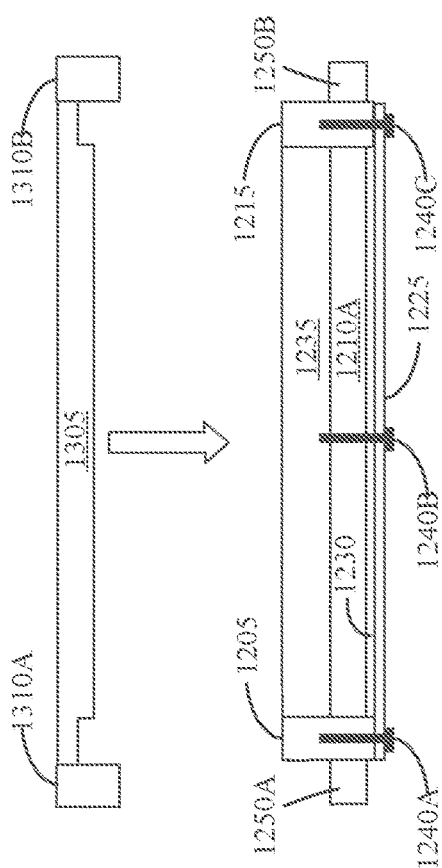
FIGS. 13A and 13B illustrate a second assembly of the example second assembly of FIGS. 12A, 12B and 12C connected to a body structure in accordance with the teachings of this disclosure.
Figure 13B:
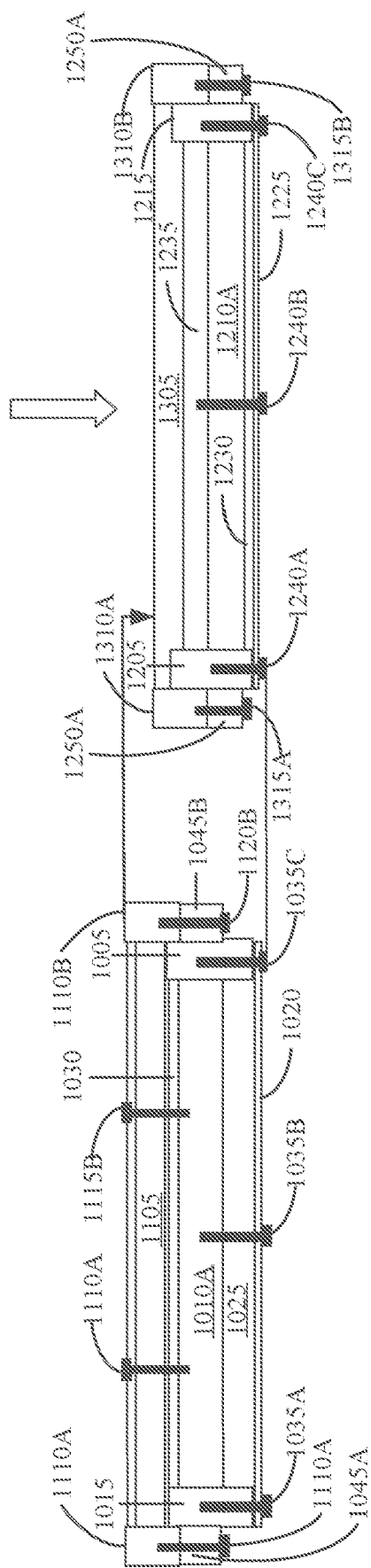

FIGS. 13A and 13B illustrate a second assembly of the example second assembly of FIGS. 12A, 12B and 12C connected to a body structure in accordance with the teachings of this disclosure. The illustrated example of FIG. 13A includes the longitudinal frame rail 1205 and the frame cross-member 1210A of FIG. 12A, the longitudinal frame rail 1215, the battery pack structure 1225, the battery pack cross-member 1230, the battery module 1235, and the extensions 1250A, 1250B of FIG. 12B, and the bolts 1240A, 1240B, 1240C of FIG. 12C. The illustrated example of FIG. 13A further includes an example underbody cross-member 1305 and example rockers 1310A, 1310B.

In the illustrated example of FIG. 13A, the underbody cross-member 1305 is connected to the bottom surface of the body of the electric vehicle to provide structural support and stiffness for the body. The underbody cross-member 1305 is connected to the rockers 1310A, 1310B, which run longitudinally along the sides of the body to provide structural support for the body. In the illustrated example of FIG. 13A, the underbody cross-member 1305 and the rockers 1310A, 1310B are lowered onto the top surface of the frame cross-member 1210A, the top surface of the longitudinal frame rail 1205, the top surface of the longitudinal frame rail 1215, and the top surfaces of the extensions 1250A, 1250B, which is described in further detail below in connection with FIG. 13B.

The illustrated example of FIG. 13B includes the longitudinal frame rail 1205 and the frame cross-members 1210A of FIG. 12A, the longitudinal frame rail 1215, the battery pack structure 1225, the battery pack cross-member 1230, the battery module 1235, and the extensions 1250A, 1250B of FIG. 12B, the bolts 1240A, 1240B, 1240C of FIG. 12C, and the underbody cross-member 1305 and the rockers 1310A, 1310B of FIG. 13A. The illustrated example of FIG. 13B further includes the longitudinal frame rail 1005 and the frame cross-member 1010A of FIG. 10A, the longitudinal frame rail 1015, the battery pack structure 1020, the battery pack cross-member 1025, the battery module 1030, and the extensions 1045A, 1045B of FIG. 10B, the bolts 1035A, 1035B, 1035C of FIG. 10C, the underbody cross-member 1105 and the rockers 1110A, 1110B of FIG. 11A, and the bolts 1115A, 1115B and the bolts 1120A, 1120B of FIG. 11B.

In the illustrated example of FIG. 13B, the extensions 1250A, 1250B of the frame cross-member 1210A are connected to the rockers 1310A, 1310B using the bolts 1315A, 1315B. In some examples, the bolts 1315A, 1315B can alternatively be other fasteners, such as nuts, screws, etc. In some examples, the bolts 1315A, 1315B are bolted from the bottom of the extensions 1250A, 1250B up through the rockers 1110A, 1110B. In the illustrated example of FIG. 13B, the second assembly of FIG. 13B is more compact than the first assembly of FIG. 11B. The battery pack cross-member 1230 is smaller in height than the battery pack cross-member 1025. In the illustrated example, the frame cross-member 1210A is inserted lower on the longitudinal frame rail 1205 and the longitudinal frame rail 1215 compared to where the frame cross-member 1010A is inserted on the longitudinal frame rail 1005 and the longitudinal frame rail 1015. In some examples, the example, the lower insertion of the frame cross-member 1210A lower on the longitudinal frame rail 1205 and the longitudinal frame rail 1215 allows for the underbody cross-member 1305 to be inserted further down in the vertical direction compared to where the underbody cross-member 1105 is inserted. In some examples, the lower insertions of the frame cross-member 1210A and the underbody cross-member 1305 improve the packaging of the battery pack by decreasing the size of the battery pack. In some examples, the second assembly of FIG. 13B is an alternative example of the first assembly of FIG. 11B that includes modifications for a smaller design of the second integrated battery pack and frame structure 700 of FIG. 7.

From the foregoing, it will be appreciated that example methods, apparatus and articles of manufacture have been disclosed that integrates a battery pack into the frame of an electric vehicle to improve structural performance and packaging of the battery modules in the battery pack. The example methods, apparatus and articles of manufacture improve battery pack integration into the frame structure of electric, body on frame vehicles. The example methods, apparatus and articles of manufacture include battery pack cross-members that improve stiffness for load paths from side impact events. The example methods, apparatus and articles of manufacture use existing structures of the vehicle frame to minimize the amount of space consumed by the battery pack and to minimize any added weight of integrating the battery pack (to increase energy usage efficiency for the electric vehicle).

Example methods, apparatus, systems, and articles of manufacture for an integrated frame and battery pack structure for electric vehicles are disclosed herein. Further examples and combinations thereof include the following:

Example 1 includes an electric vehicle comprising a frame of the electric vehicle to which a body of the electric vehicle is coupled, the frame including longitudinal frame rails, a mid-section of the frame not including frame cross-members, and a battery pack mounted in the mid-section of the frame, the battery pack including battery pack cross-members, each of the battery pack cross-members connected to a top surface of the longitudinal frame rails and a bottom surface of the longitudinal frame rails.

Example 2 includes the electric vehicle of example 1, wherein the battery pack includes battery modules positioned between the battery pack cross-members and between the longitudinal frame rails.

Example 3 includes the electric vehicle of example 1, wherein the longitudinal frame rails include flanges on at least one of the top surface or the bottom surface.

Example 4 includes the electric vehicle of example 3, wherein the battery pack cross-members are connected to the flanges on the at least one of the top surface or the bottom surface.

Example 5 includes the electric vehicle of example 1, wherein the battery pack cross-members are connected to the top surface of the longitudinal frame rails and the bottom surface of the longitudinal frame rails via bolts.

Example 6 includes the electric vehicle of example 1, wherein the battery pack is to be installed and removed in one piece from the frame.

Example 7 includes an electric vehicle comprising a frame of the electric vehicle isolated from a body of the electric vehicle, the frame including longitudinal frame rails and frame cross-members fixed to the frame, and a battery pack including battery pack cross-members, the battery pack cross-members connected to respective bottom surfaces of the frame cross-members and the longitudinal frame rails.

Example 8 includes the electric vehicle of example 7, wherein the battery pack includes battery modules positioned between the battery pack cross-members, the frame cross-members, and the longitudinal frame rails.

Example 9 includes the electric vehicle of example 7, wherein the frame cross-members extend through the longitudinal frame rails.

Example 10 includes the electric vehicle of example 9, wherein a first part of each frame cross-member is connected to a respective battery pack cross-member on a first side of the longitudinal frame rails.

Example 11 includes the electric vehicle of example 10, wherein the body includes rockers, and wherein a second part of each frame cross-member is connected to a rocker on a second side of the longitudinal frame rails opposite the first side of the longitudinal frame rails.

Example 12 includes the electric vehicle of example 7, wherein the battery pack cross-members are connected to the respective bottom surfaces of the frame cross-members and the longitudinal frame rails via bolts.

Example 13 includes the electric vehicle of example 7, wherein the battery pack further includes longitudinal cross-members between at least two of the battery pack cross-members to increase stiffness of the frame in response to frontal loads.

Example 14 includes the electric vehicle of example 7, wherein each of the battery pack cross-members is connected to the respective bottom surfaces of the frame cross-members and the longitudinal frame rails to at least increase stiffness of the frame, support a weight of the battery pack, and reduce twisting of the frame.

Example 15 includes an apparatus comprising an electric vehicle assembly having a body and a frame, the frame isolated from the body, a mid-section of the frame not including frame cross-members, and a battery pack removably coupled to the frame via bolts, the battery pack including battery pack cross-members between longitudinal frame rails in a mid-section of the frame.

Example 16 includes the apparatus of example 15, wherein the battery pack includes battery modules positioned between the battery pack cross-members and between the longitudinal frame rails.

Example 17 includes the apparatus of example 15, wherein each of the battery pack cross-members are connected to a top surface of the longitudinal frame rails and a bottom surface of the longitudinal frame rails.

Example 18 includes the apparatus of example 17, wherein the longitudinal frame rails include flanges on at least one of the top surface or the bottom surface.

Example 19 includes the apparatus of example 18, wherein the battery pack cross-members are connected to the flanges on the at least one of the top surface or the bottom surface.

Example 20 includes the apparatus of example 15, wherein the battery pack is to be removed from the frame in one piece.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
an integral battery pack structure including:
  a first wall having a first end and a second end;
  a first flange extending from the first end, the first flange to be coupled to a first surface of a longitudinal rail of a frame of a vehicle;
  a second wall including a third end and fourth end, the first wall and the second wall defining an interior;
  a skid plate extending between the second end and the fourth end;
  a second flange extending from the third end, the second flange to be coupled to a second surface of the longitudinal rail opposite the first surface;
  a battery disposed within the interior; and
  a cross member disposed within the interior.

2. The apparatus of claim 1, wherein the battery is a first battery and the apparatus further includes a second battery separated from the first battery by the cross member.

3. The apparatus of claim 1, wherein the integral battery pack structure further includes a top plate, the top plate and the skid plate further defining the interior.

4. The apparatus of claim 1, wherein the first flange is to be coupled to a top surface of the longitudinal rail.

5. The apparatus of claim 1, further including at least five cross members including the cross member.

6. The apparatus of claim 1, wherein the integral battery pack structure is to abut the longitudinal rail.

7. The apparatus of claim 1, further including a third flange coupled to the second end, the third flange to be coupled to a third surface of a second longitudinal rail of the frame.

8. The apparatus of claim 1, wherein the first flange is parallel to the second flange.

9. An apparatus comprising:
  a battery pack structure;
  a first battery coupled to the battery pack structure;
  a second battery coupled to the battery pack structure; and
  a battery pack cross member disposed between the first battery and the second battery, the battery pack cross member to be coupled to and in contact with a frame of a vehicle; and
  a first fastener disposed adjacent to a first end of the battery pack cross member, the first fastener to couple the battery pack structure to a first frame rail; and
  a second fastener disposed adjacent to a second end of the battery pack cross member, the second fastener to couple the battery pack structure to a second frame rail of the vehicle.

10. The apparatus of claim 9, wherein the battery pack cross member includes a top surface to be coupled to a cross member of the vehicle.

11. The apparatus of claim 9, wherein the battery pack cross member includes a bottom surface to be coupled to the battery pack structure.

12. The apparatus of claim 9, wherein the battery pack cross member is a first battery pack cross member disposed on a first side of the first battery, the apparatus further including:
  a second battery pack cross member disposed on a second side of the first battery, the second side opposite the first side; and
  a longitudinal member extending between the first battery pack cross member and the second battery pack cross member.

13. The apparatus of claim 12, wherein the second battery pack cross member is to be coupled to the frame.

14. The apparatus of claim 9, further including a third fastener to couple the battery pack cross member to the frame, the third fastener disposed at a center of the battery pack cross member.

15. The apparatus of claim 9, further including at least four battery pack cross members including the battery pack cross member.

16. The apparatus of claim 9, wherein the battery pack structure includes a skid plate.

* * * * *